US007088817B1

(12) United States Patent
Tanrikulu et al.

(10) Patent No.: US 7,088,817 B1
(45) Date of Patent: Aug. 8, 2006

(54) METHOD AND APPARATUS FOR PERFORMING HIGH-DENSITY DTMF, MF-R1, MF-R2 DETECTION

(75) Inventors: Oğuz Tanrikulu, Wellesley, MA (US); Sidd Gupta, Watertown, MA (US)

(73) Assignee: Tellabs Operations, Inc., Naperville, IL (US)

( * ) Notice: Subject to any disclaimer, the term of this patent is extended or adjusted under 35 U.S.C. 154(b) by 957 days.

(21) Appl. No.: 09/696,730

(22) Filed: Oct. 25, 2000

(51) Int. Cl.
*H04M 1/00* (2006.01)

(52) U.S. Cl. .................. 379/386; 379/372; 379/399.01
(58) Field of Classification Search ................ 379/386, 379/283, 142.18, 418, 372, 399.01; 704/312, 704/405
See application file for complete search history.

(56) References Cited

U.S. PATENT DOCUMENTS

| | | | | |
|---|---|---|---|---|
| 5,119,322 A | * | 6/1992 | Stroobach | 708/312 |
| 5,353,346 A | * | 10/1994 | Cox et al. | 379/386 |
| 5,392,348 A | * | 2/1995 | Park et al. | 379/386 |
| 5,428,680 A | | 6/1995 | Murata et al. | |
| 5,619,564 A | * | 4/1997 | Canniff et al. | 379/386 |

OTHER PUBLICATIONS

Vaidyanathan, P.P., "Multi-rate Systems and Filter Banks," *Prentice-Hall* (1993).
Tanrikulu, O. and Kalkan, M., "Design and Discrete Re-optimization of All-pass Based Power Symmetric IIR Filters," *Electronics Letters*, 32 (16) : 1458-1460 (1996).
Valenzuela, R.A and Constantinides, A.G., "Digital Signal Processing Schemes for Efficient Interpolation and Decimation," *IEE Proceedings-G, Circuits Devices and Systems*, 130 (6) : 225-235 (1983).
Tanrikulu, O., "Adaptive Signal Processing Algorithms with Accelerated Convergence and Noise Immunity," Ph.D. Thesis, Imperial College of Science, Technology and Medicine, University of London (1995).
Mitra, S.K. and Hirano, K., "Digital All-Pass Networks," *IEEE Trans. Circuits Systs.*, Cas -21(5) : 688-700 (1974).
Tanrikulu, O., et al., "Finite-Precision Design and Implementation of All-Pass Polyphase Networks for Echo Cancellation in Sub-Bands," ICASSP-95, Detroit, USA, 4: 3039-3042 (May 1995).

* cited by examiner

*Primary Examiner*—Jefferey F. Harold
(74) *Attorney, Agent, or Firm*—Hamilton, Brook, Smith & Reynolds, P.C.

(57) ABSTRACT

Detectors determine the presence of valid sinusoids for DTMF, MF-R1 and MF-R2 protocols for encoding dialed digits. The detectors split electrical signals into subbands. Energies within the subbands are analyzed to determine a presence of sinusoids corresponding to frequencies of dialed digits. In one embodiment, the detectors comprise a PS-IIR filter to split the electrical signal into the subbands. The detectors further comprise at least one bank of filters, such as notch filters, corresponding to the number of possible relevant frequencies within the respective subbands. The detectors further comprise detection logic comprising tests, which may include analyzing the output(s) from the bank of filters. Optionally, a preclassifier is employed to predetermine which filters in the banks of filters are to be executed. The detectors, typically deployed in digital signal processors, allow for an increase in the density of detectors and provide robust performance in talk-off situations.

82 Claims, 18 Drawing Sheets

DTMF DETECTOR BLOCK DIAGRAM

DTMF DETECTOR BLOCK DIAGRAM

COMPACT IMPLEMENTATION OF A FIRST-ORDER ALL-PASS SECTION

DTMF DETECTION LOGIC

MF-R1 DETECTOR BLOCK DIAGRAM

MF-R2 FORWARD DETECTOR BLOCK DIAGRAM

MF-R2 BACKWARD DETECTOR
BLOCK DIAGRAM.

DTMF DETECTION LOGIC

METHOD AND APPARATUS FOR PERFORMING HIGH-DENSITY DTMF, MF-R1, MF-R2 DETECTION

BACKGROUND OF THE INVENTION

The information age has increased the number of users using data communication systems. Initially, voice was the primary signal carried by phone lines. Next, facsimile (i.e., fax) machines became a popular means for transferring information, though typically restricted to business environments. Recently, with the advent of the Internet, data communications between and among electronic devices has become a common mode of communications for both businesses and individuals. The increase in mode, user group, and usage has driven the telecommunications industry in general, and service providers in particular, to expand capacity. One of the limiting factors of service capacity is the size of detectors for determining dialed digits by various dialing protocols, such as DTMF.

Detection of the dialed digits at the beginning of a phone connection is as old as the PSTN (Public Switched Telephone Network) itself. The requirements are well defined and understood. A current interest is in maximizing the density of DTMF/MF-R1/MF-R2 detection and maintain a high degree of reliability.

In DTMF (Dual-Tone Multi-Frequency) detection, the dialed digits correspond to a row-frequency and a column-frequency, as shown in Table 1. In MF-R1 (Multi-Frequency, One Row) and MF-R2 (Multi-Frequency, Two Rows) detection, two valid frequencies correspond to a dialed digit, although there are no row or column frequencies as in DTMF. Also note that, in MF-R2, two sets of the frequencies are used depending upon the signaling direction. The MF-R1 and MF-R2 frequencies are respectively shown in Tables 2 and 3.

TABLE 1

| Hz  | 1209 | 1336 | 1447 | 1633 |
|-----|------|------|------|------|
| 697 | 1    | 2    | 3    | A    |
| 770 | 4    | 5    | 6    | B    |
| 852 | 7    | 8    | 9    | C    |
| 941 | 0    | 0    | #    | D    |

TABLE 2

| Hz | 700 | 900 | 1100 | 1300 | 1500 | 1700 |
|----|-----|-----|------|------|------|------|

TABLE 3

| FWD | 1380 | 1500 | 1620 | 1740 | 1860 | 1980 |
|-----|------|------|------|------|------|------|
| BWD | 540  | 660  | 780  | 900  | 1020 | 1140 |

In each case, a bandwidth-test and a twist-test must be passed. In the bandwidth-test, frequency deviations greater than 3.5% must be rejected, and frequency deviations less than 1.5% must be declared as valid digits. In the twist-test, powers at the frequencies of interest must be within certain limits with respect to each other. Furthermore, signals from the line that have power levels less than −40 dBm0 must be rejected. A condition that is particular to DTMF is falsely detecting digits when there is speech activity on the line. This condition is known as talk-off.

One way to increase the density of detectors to allow service providers to support more users is to change (i.e., reduce) the sampling rate of the incoming analog signal. Changing the sampling rate of the incoming signal for detection is not a new idea, and there are numerous patents on the subject. However, this concept is poorly applied in many cases and there is a great loss of efficiency. For example, the sampling rate of conversion is often implemented through finite impulse response (FIR) multi-rate filters (MRF), which are inefficient in terms of memory and complexity. These are usually implemented by filtering followed by a switch for straight decimation operations. Therefore, the filtering is performed at the higher sampling frequency. A better scheme would be the polyphase implementation of an FIR MRF filter. See P. P. Vaidyanathan, Multi-Rate Systems and Filter Banks, Prentice-Hall, 1993. In this representation, the switching comes first and the FIR coefficients are distributed after the switch. In this way, the filtering is performed at the lower sampling rate.

SUMMARY OF THE INVENTION

Although using FIR MRF filters is a fine idea, it is still inefficient in the context of DTMF due to the aforementioned reasons. For sufficient band isolation, a large number of coefficients might be necessary, and a high number of memory locations are necessary to store the filter histories; thus, a significant computational overhead for filtering is required by the FIR-based MRFs. These shortcomings pose serious problems in high-density applications, since it is desirable to use only the on-chip memory for faster data acquisition and to minimize computational complexity.

In an application, such as telephony, an electrical signal comprising multiple sinusoids that encodes dialed digits is split into multiple subbands. Energies within the subbands are analyzed to determine a presence of sinusoids corresponding to frequencies of dialed digits.

A PS-IIR (power-symmetric infinite impulse response) filter may be employed to split the electrical signal into the subbands. Typically, the electrical signal is split into subbands of 0–1 kHz and 1–2 kHz. Preferably, the PS-IIR filters are implemented in a polyphase form, and all-pass sections composing the PS-IIR filters may be implemented through compact realizations. PS-IIR filters are used to maximize the density of DTMF/MF-R1/MF-R2 detection and to maintain a high degree of reliability. PS-IIR filters have ideal features for use in detection of dialed digits and can be used for all three detector designs. Techniques employing PS-IIR filters increase density of detectors and provide robust performance in talk-off situations in DTMF.

The subbands, resulting from whatever band split filter implementation is chosen, are further filtered via a bank of notch filters corresponding to the number of possible relevant frequencies within the respective subbands; the number of relevant frequencies depends on the encoding protocol, DTMF, MF-R1, or MF-R2. The filters are typically notch filters, such as second order infinite impulse response filters. For DTMF detectors, there are four notch filters in the filter banks. For MF-R1 detection, there are two notch filters for the 0–1 kHz subband and four notch filters for the 1–2 kHz subband. For MF-R2 detection, a forward detector comprises six notch filters in the bank of filters for the 1–2 kHz subband; a backward detector comprises (i) a notch filter at 980 Hz and four other notch filters in the bank of filters for the 0–1 kHz subband and (ii) two notch filters in the bank of filters for the 1–2 kHz subband. Further, a preclassifier using frequency estimation may be employed to select only those notch filters corresponding to frequencies determined to be active in the subbands.

The detectors further comprise detection logic. The detection logic analyzes the subbands to determine whether the sum of the energies exceeds a minimum threshold energy level. The detection logic also performs a twist-test to determine whether the energies in the subbands are within a twist-test threshold. For each subband, the detection logic compares energy levels between the lowest energy output of the notch filters and the input energy to the respective bank of filters. The detection logic aborts detector execution in the event that an energy level test determines a discrepancy with a respective specified criterion and reports valid digits after determining the presence of corresponding valid sinusoids in the electrical signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
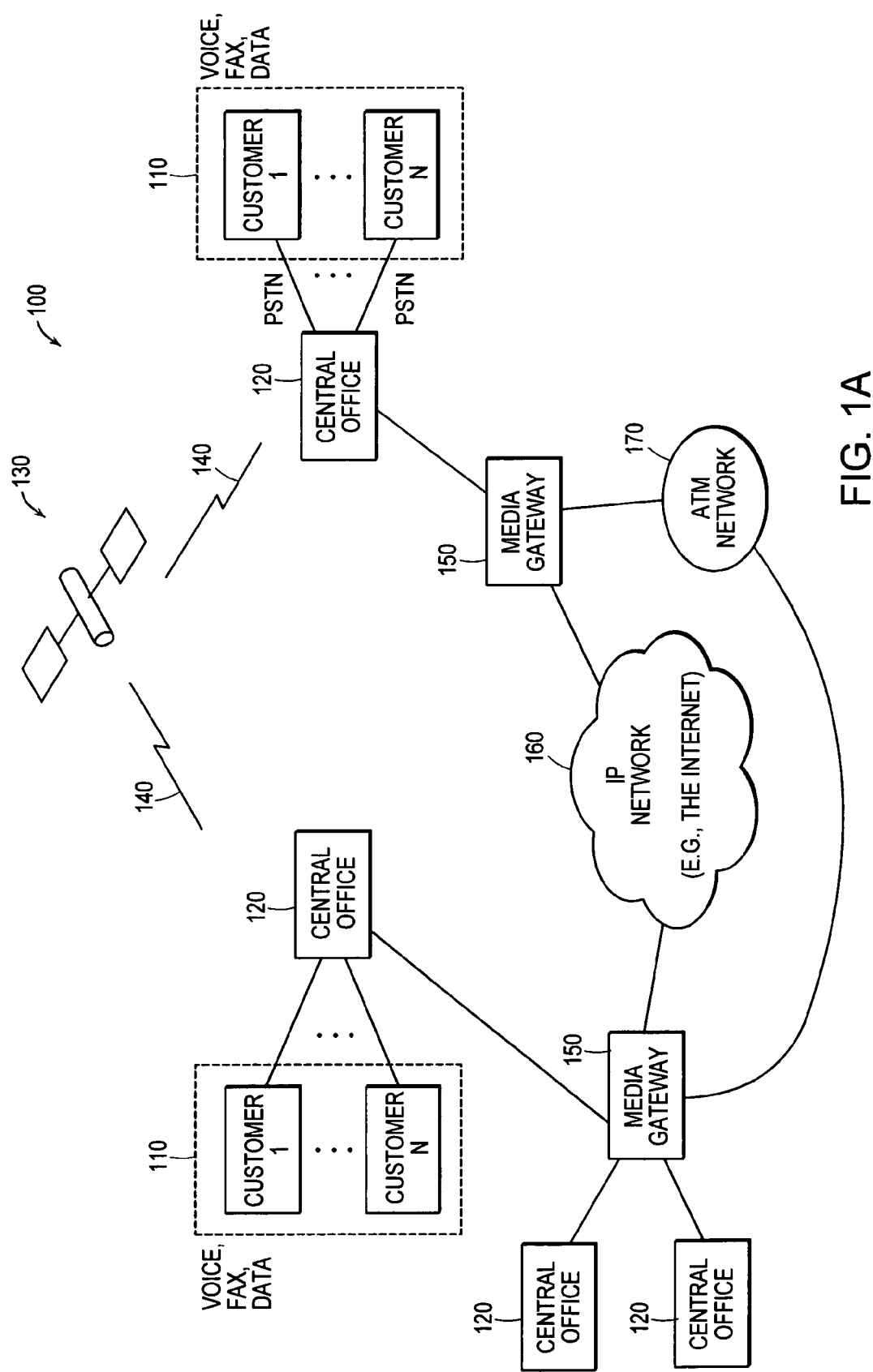
FIG. 1A is a block diagram of an example telephone network having central offices comprising multi-tone detectors designed according to the principles of the present invention.

A description of preferred embodiments of the invention follows.

With the ever-increasing demand to access the telephony network, switching equipment now has to perform DTMF, MF-R1/R2 detection on many more channels. High density detection of dialed digits via DTMF, MF-R1, MF-R2 detection is implemented such that density of the number of channels per digital signal processor (in a digital implementation) is increased.

Density in detector channels is increased in two ways. First, by splitting an input signal into subbands, filters employed by the processor operate at slower sampling rates (i.e., lower bandwidths) and are, therefore, less complex. Further, because the filters operate at slower sampling rates, the processor saves instruction cycles for other operations, including supporting additional detector channels. Second, density is further improved through the use of a PS-IIR (power symmetric infinite impulse response) filter in the subband splitter.

The PS-IIR filter can be implemented in a minimal memory form by cascading two first-order all-pass filter sections to implement low- and high-pass filters, which compose the PS-IIR filter. In a preferred embodiment, a compact implementation of a first-order all-pass filter section requires only a single coefficient, a single multiplier, and a single unit delay (i.e., storage element). Thus, the PS-IIR filter requires only four storage elements, four coefficients, and very few processor clock cycles.

Banks of notch filters are used to detect the dialed digits encoded in sinusoidal signals at various frequencies. The detector may also comprise at least one preclassifier that performs frequency estimation on the subband signals to determine frequencies of sinusoids in the subbands and enables notch filters within the respective banks of filters corresponding to the frequencies of the sinusoids. In this way, notch filters that do not have an affect on processing of the sinusoids are disabled (i.e., not executed by the processor) to save a significant number of clock cycles.

Detection logic executed by the processor comprises several tests before declaring a valid dialed digit. These tests include an energy level test and a twist-test on the energies in the subbands. The detection logic saves bandwidth in the DSP by exiting upon determining that the input signal does not include a sinusoid-encoded, dialed digit. The detection logic provides support to minimize talk-off errors. Employing the principles of the present invention, it is possible to perform DTMF detection on 1200 or more channels on a single 250 MHZ TMS320C6202 DSP processor. This implementation more than doubles the capacity of preceding solutions. Further, this approach is especially robust against false alarms over speech signals due to talk-off.

When implemented in a digital form, the detectors can be changed to support detection of DTMF, MF-R1, or MF-R2 protocol-encoded dialed digits. Each detector type is implemented with similar building blocks (e.g., PS-IIR band split filters), so each type has similar size, accuracy, and speed benefits, as discussed above. Differences among the different detector types are found in the detector structures and detection logic processes to support the various dialed digit protocols, as discussed in detail below in reference to FIGS. 1–15.

FIG. 1A is a block diagram of a data network 100, which is a subset of a telephony system, in which the present invention may be deployed. Customers 110 communicate to central offices 120. The central offices 120 communicate to one another via inter-central office transmissions 140 via a satellite 130 or via packetized communications across a network, such as an IP (Internet Protocol) network 160 or ATM (Asynchronous Transmission Mode) network 170. Access to the IP network 160 and ATM network 170 is through a media gateway 150. The principles of the present invention lend themselves to any system employing tone detection, e.g., touch tone navigation systems.

The customers 110 may communicate to the central offices 120 using voice, telephone, fax, or data accessories (not shown). When connecting to the telephony system, the telephones or other telephony equipment generate sinusoids at specified frequencies according to the DTMF, MF-R1, or MF-R2 protocol used to encode the dialed digits.

Most computer users are familiar with dialed digit tones produced by a computer modem when dialing to a service provider and the dialed digit tones produced by a telephone speaker corresponding to the telephone keypad digits. The dialed digit tones produced and heard comprise two audible frequencies resulting from the speaker acting as a transducer, converting electrical sinusoids to the audible tones. It is these electrical sinusoids that are detected and decoded as dialed digits by equipment in a central office 120. Before discussing details of an embodiment of the equipment employed in a central office 120, a general description of an embodiment employed by a media gateway is presented in FIG. 1B.

Figure 1B:
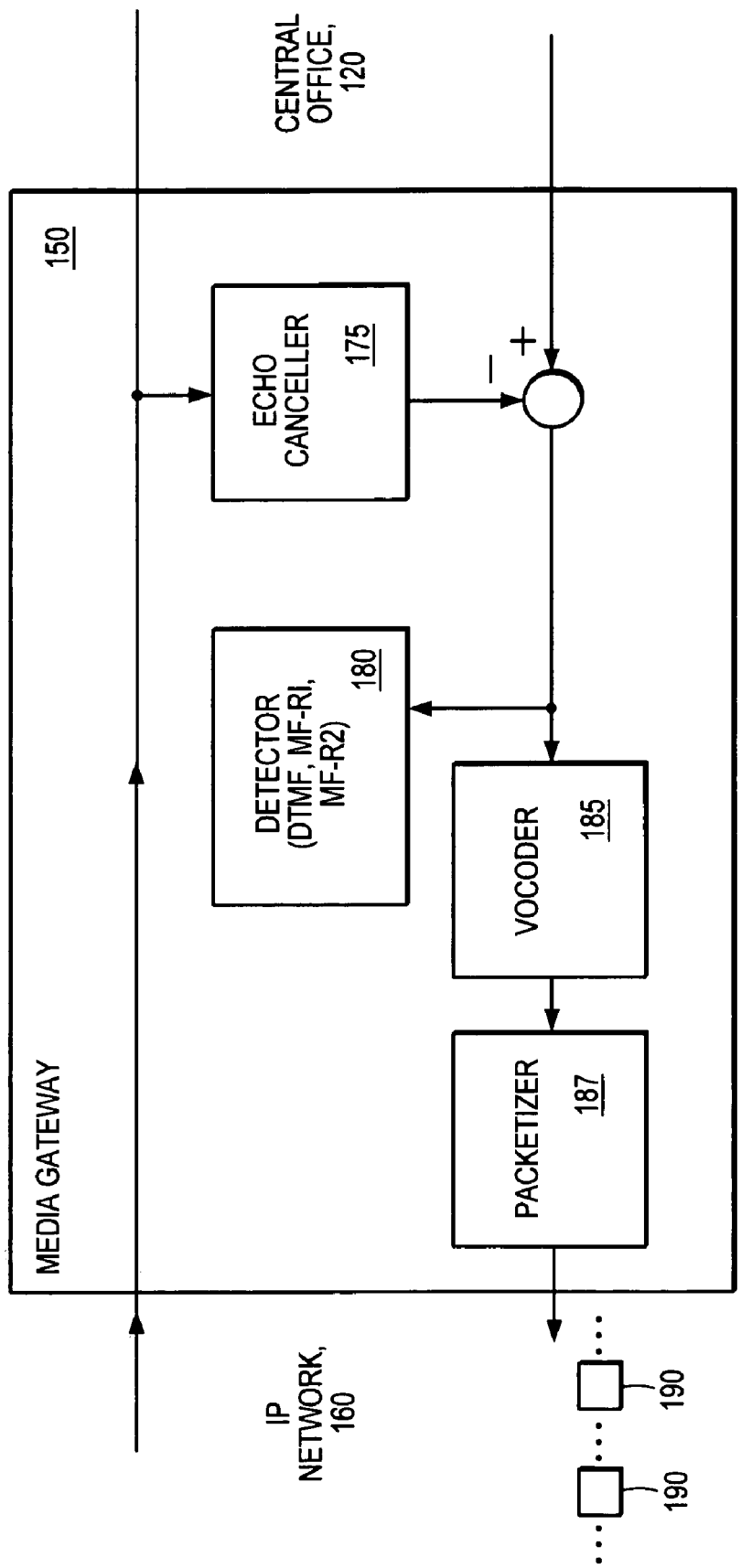
FIG. 1B is a block diagram of a media gateway of FIG. 1A employing a multi-tone detector.

FIG. 1B is a block diagram of a media gateway 150 comprising an echo canceler 175, detector 180, and vocoder (i.e., voice-coder) 185. In this example, the media gateway 150 is shown as a network device facilitating voice-over-Internet Protocol (VOIP). Voice-over-IP is an inexpensive means for communicating across long distances. A voice signal is converted into network packets by the media gateway 150. The network device receiving the IP packet 190 containing the voice signal information converts the data in the network packet 190 back into a voice signal. Radio stations and other broadcast facilities may employ media gateways 150 to broadcast signals over the Internet 160 (FIG. 1A).

The echo canceler 175 removes echoes caused by leakage of electrical signals from hybrids (not shown), having an impedance mismatch, in the media gateway 150 and central office 120, for example. The detector 180 determines sinusoidal tones, indicating dialed digits, received from the central office 120. The detector 180 can be configured to detect DTMF tones, MF-R1 tones, or MF-R2 tones. The vocoder 185 is employed to compress speech signals to increase the bandwidth efficiency. Finally, a packetizer 187 converts the vocoder output to IP packets 190, or other forms of data packets used to transmit data across the data network 100. The IP packets 190 are transmitted across the IP network 160 to an address corresponding to the dialed digits detected by the detector 180. It should be understood that the vocoder 185 can be other forms of encoders, such as video encoders to transmit video streams rather than audio streams. The echo canceler may be of the type described in U.S. patent application Ser. No. 09/350,497, incorporated herein by reference in its entirety.

Figure 2:
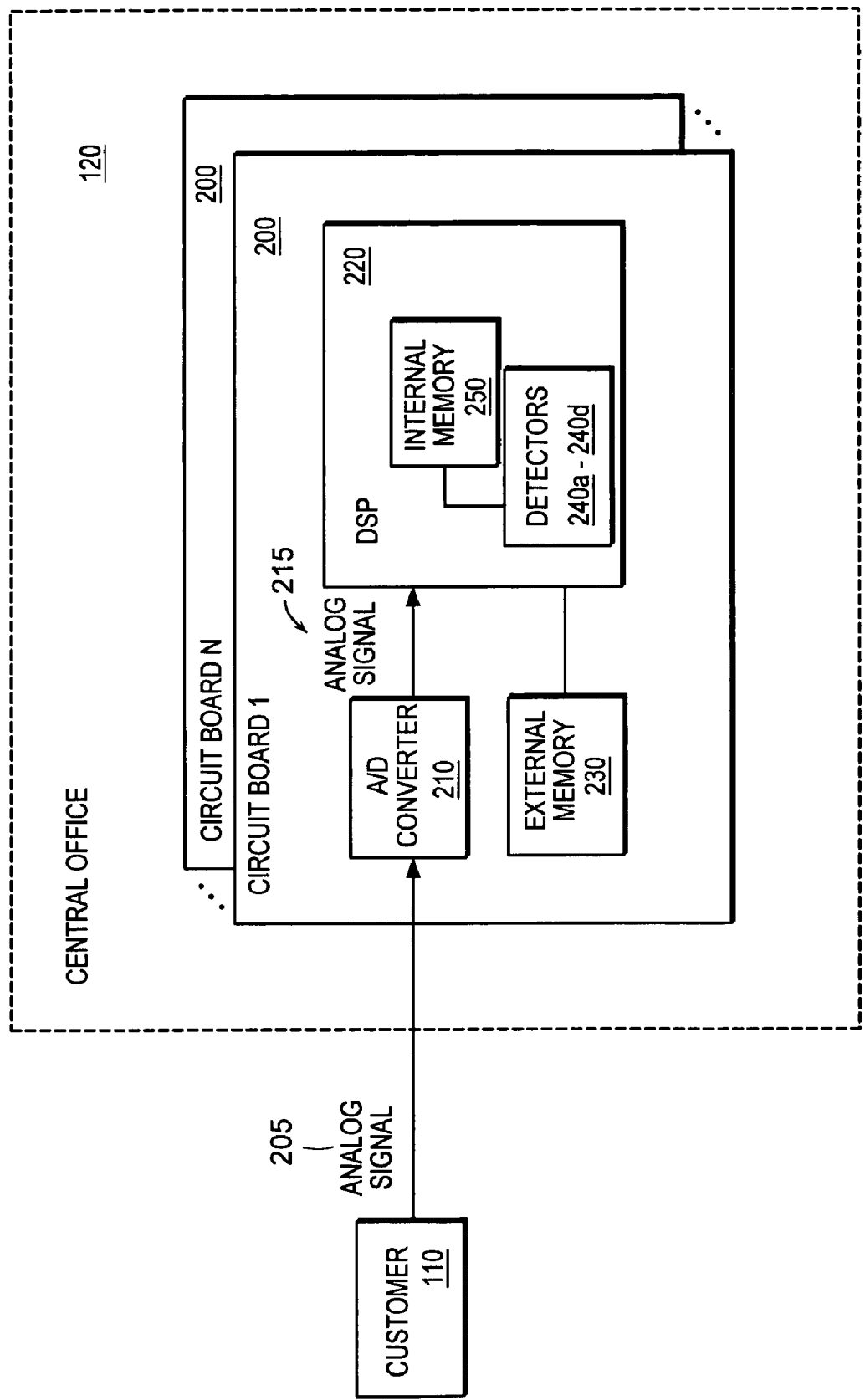
FIG. 2 is a block diagram of a circuit board employing the detectors in a central office of FIG. 1A.

FIG. 2 is a block diagram of equipment in the central office 120 that is used to detect sinusoids used to encode the dialed digits. The circuit boards 200 comprise an analog-to-digital (A/D) converter 210, digital signal processor (DSP) 220, and external memory 230.

The A/D converter 210 receives an analog signal 205, which is a continuous-time form of an electrical signal, from telephony equipment (not shown) used by the customer 110. The analog signal 205 comprises the sinusoids used to encode the dialed digits. The A/D converter 210 converts the analog signal 205 to a corresponding digital signal 215 at a sampling rate of about 4 kHz.

The DSP 220 comprises internal memory 250, which may include cache, RAM, or ROM, i.e., volatile or non-volatile memory components. The DSP further comprises detectors 240a–240d (collectively 240). The detectors 240, in the DSP 220 case, are software programs executed by the DSP 220. Because the detectors 240 are implemented in software, they can be quickly changed among DTMF, MF-R1, and MF-R2 detectors to support the dialed digit protocol of the calling device (not shown).

During execution, the detectors 240 access the internal memory 250 for various typical reasons, such as recalling multiplier coefficients or storing intermediate arithmetic results. The detectors 240 may also access external memory 230 for similar or other reasons. Because accessing the external memory 230 typically takes more time than accessing the internal memory 250, initialization parameters for the detectors 240 are generally stored in the external memory 230, while the DSP 220 typically employs the internal memory 250 for real-time memory usages.

Figure 3:
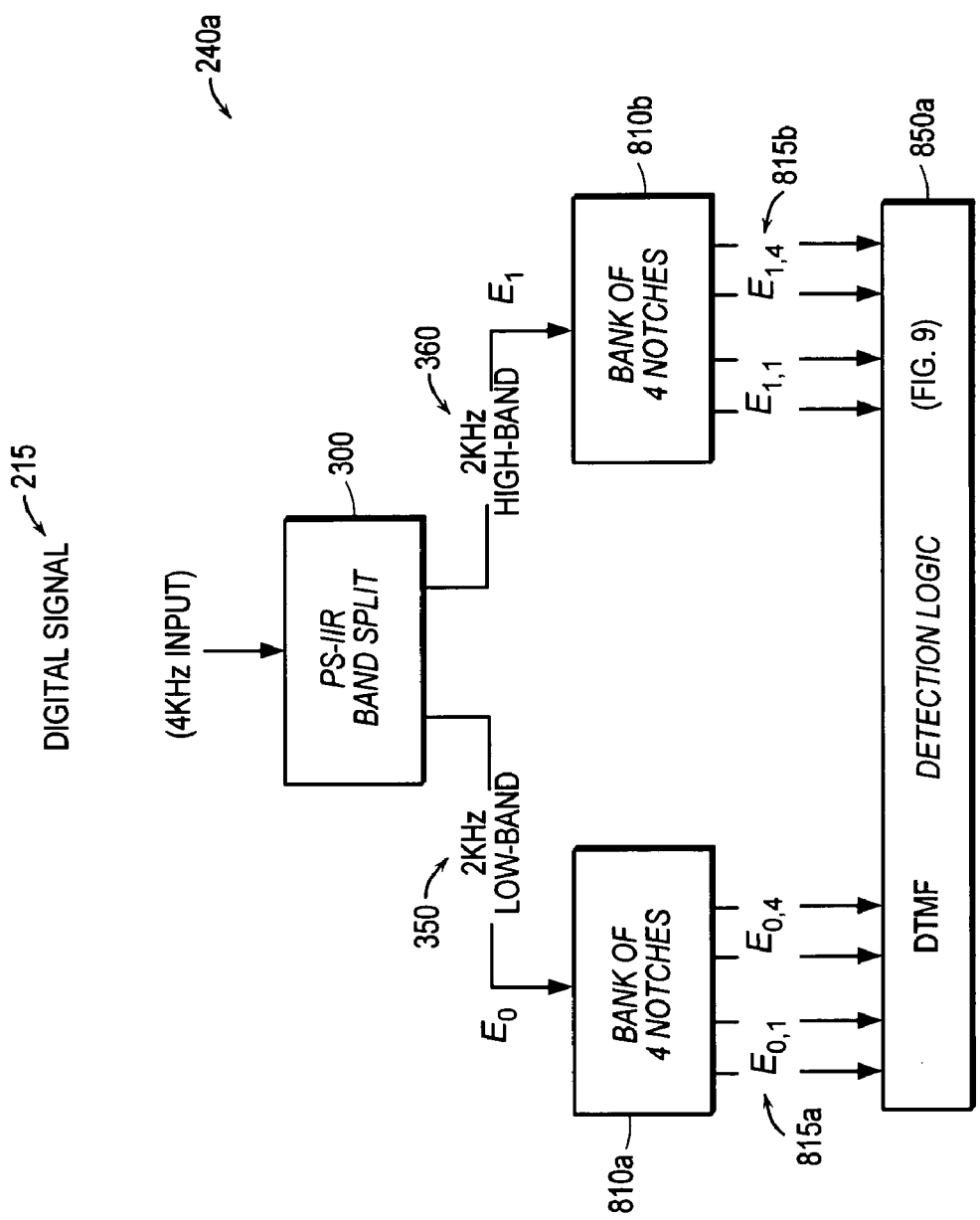
FIG. 3 is a block diagram of a DTMF detector executed by a digital processor on a circuit board of FIG. 2.

FIG. 3 is an embodiment of a DTMF detector 240a executed by the DSP 220 of FIG. 2. The DTMF detector 240a comprises: a PS-IIR band-split filter 300, banks of filters referred to as (i) DTMF low-band notch filters 810a and (ii) DTMF high-band notch filters 810b, respectively, and DTMF detection logic 850a.

The PS-IIR band-split filter 300 receives the digital signal 215 from the A/D converter 210 (FIG. 2). The PS-IIR band-split filter 300 subdivides the digital signal 215 into a 2 kHz low-band signal 350, comprising frequencies between 0 Hz and about 1 kHz, and a 2 kHz high-band signal 360, comprising frequencies between about 1 kHz and 2 kHz. Because the 2 kHz low-band signal comprises frequencies between 0 Hz and about 1 kHz, the 2 kHz low-band signal 350 is sometimes referred to as a 0–1 kHz subband. Also, because the 2 kHz high-band signal 360 comprises frequencies between about 1–2 kHz, the 2 kHz high-band signal 360 is sometimes referred to as a 1–2 kHz subband. The low-band signal 350 and high-band signal 360 may also be referred to as simply $E_0$ and $E_1$, respectively, where "E" denotes "energy."

In the DTMF detector 240a, $E_0$ is processed by the DTMF low-band notch filters 810a, and $E_1$ is processed by the DTMF high-band notch filters 810b. The DTMF detection logic 850a processes the outputs of each of the banks of notch filters 810a, 810b. Both the banks of filters 810a, 810b and the detection logic 850a demand less processing time than similar structures processing signals comprising frequency components up to 4 kHz, which is why the PS-IIR band split filter 300 is employed.

Figure 4:
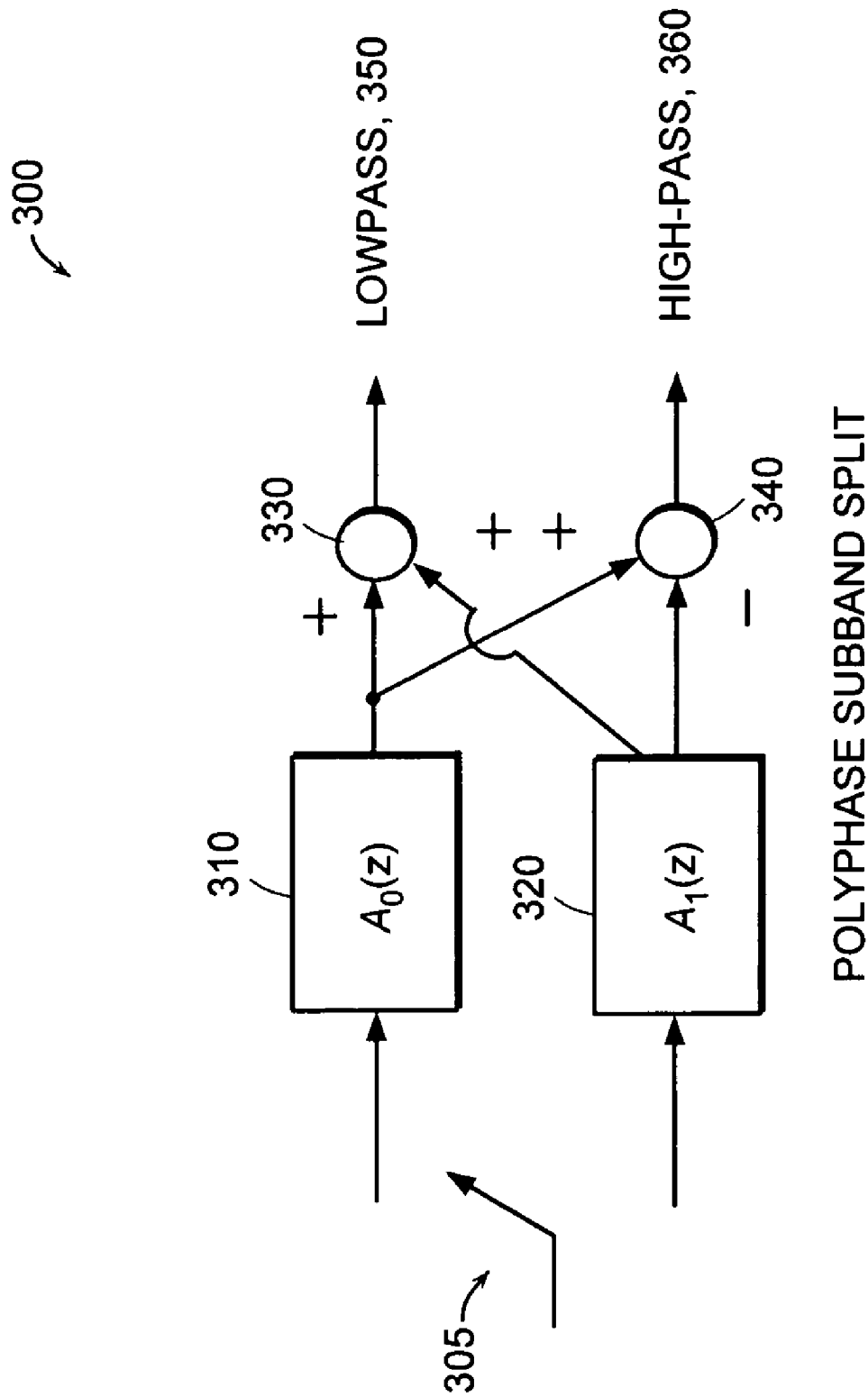
FIG. 4 is a block diagram of a generic PS-IIR filter executed by the processor of and employed by the DTMF detector of FIG. 3.

FIG. 4 is a block diagram of the PS-IIR band-split filter 300. The PS-IIR band-split filter 300 is depicted in polyphase form. An input switch 305 alternates the input between a zero'th first-order all-pass section 310 and a first first-order all-pass section 320. Outputs from first-order all-pass sections 310, 320 are added by an adder 330, producing the 2 kHz low-band signal 350; outputs from the first-order all-pass sections 310, 320 are subtracted by a subtractor 340, producing the 2 k high-band signal 360.

PS-IIR filters have the following transfer function $$H_L(z) = \frac{1}{2}(A_o(z^2) + z^{-1}A_1(z^2)), \text{ where} \qquad (1)$$

$$A_i(z^2) = \prod_{j=o}^{p_i-1} \frac{\alpha_{i,j} + z^{-2}}{1 + \alpha_{i,j}z^{-2}}, i = 0, 1 \qquad (2)$$

are cascaded, second-order, all-pass sections. Various design methods exist to find the optimal set of $\alpha_{i,j}$ to realize a desired frequency response. For more information regarding finding optimal sets of $\alpha_{i,j}$, see the following references: P. P. Vaidyanathan, Multi-rate Systems and Filter Banks, Prentice-Hall, 1993; O. Tanrikulu and M. Kalkan, "Design and Discrete Re-optimization of All-pass Based Power Symmetric IIR Filters," Electronics Letters, vol. 32, no. 16, pp. 1458–1460, 1996; R. A. Valenzuela and A. G. Constantinides, "Digital Signal Processing Schemes for Efficient Interpolation and Decimation," IEEE Proceedings-G, Circuits Devices and Systems, vol. 130, no. 6, pp. 225–235, 1983; O. Tanrikulu, *Adaptive Algorithms for Accelerated Convergence and Noise Immunity*, Ph.D. Thesis, Imperial College of Science, Technology and Medicine, 1995.

For the problem of detecting dialed digits encoded by sinusoids in an electrical signal, a PS-IIR filter splits the incoming electrical signal into two parallel signal paths at half (i.e., 2 kHz) the input sampling frequency (i.e., 4 kHz). Splitting the incoming signal into two parallel signal paths at half the input sampling frequency is desired to reduce the complexity of the detector and improve detector robustness.

The parallel signal paths separate the row and column frequencies of the DTMF case. Here, $H_1(z)$ is a low-pass filter. Thus, to separate the row and column frequencies, a mirror-image high-pass filter is needed, so, by using a transformation z→−z, the mirror-image high-pass filter is:

$$H_H(z) = \frac{1}{2}(A_o(z^2) - z^{-1}A_j(z^2)). \qquad (3)$$

Since $H_L(z)$ and $H_H(z)$ are structurally similar, the sub-band splitting operation can be implemented through the polyphase representation of FIG. 4. Note that $A_i(z^2) \rightarrow A_i(z)$ becomes a cascade of first-order all-pass sections. Furthermore, the filtering operations are conducted at the lower sampling rate. And, there is still room for improvement in the implementation of $A_i(z)$ by using a compact realization of all-pass transfer functions rather than a canonical realization. See S. K. Mitra and K. Hirano, "Digital All-pass Networks," IEEE Trans. Circuits Systs., vol. CAS-21, no. 5, pp. 688–700, September 1974.

Figure 5:
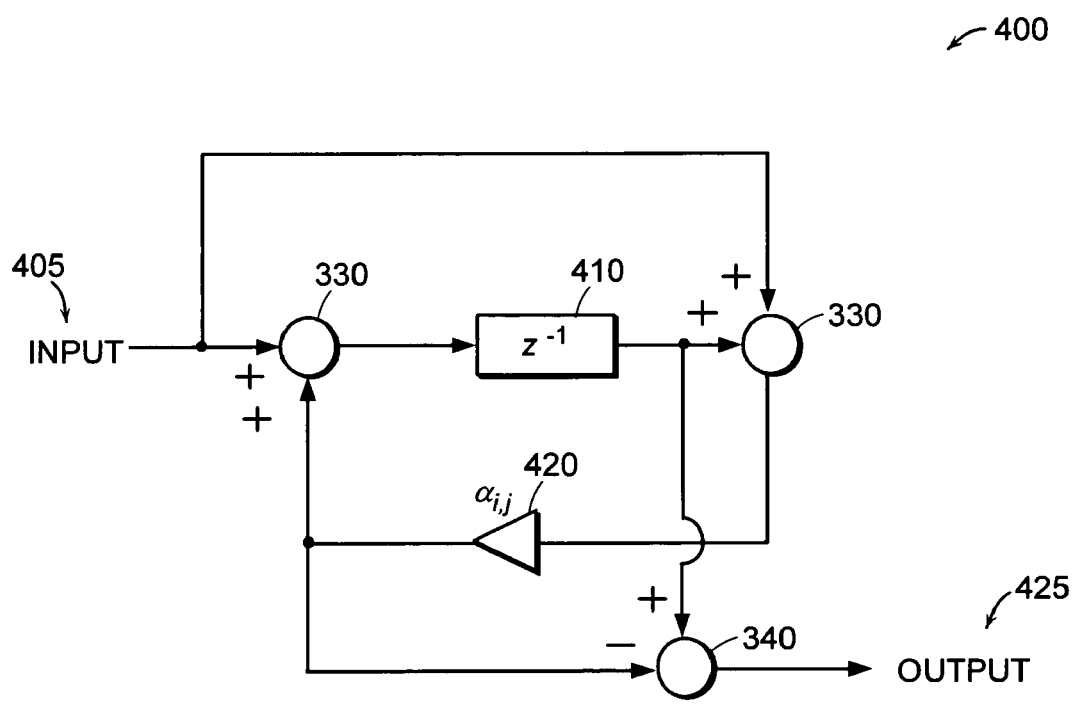
FIG. 5 is a block diagram of a compact implementation of a first-order all-pass section employed by the PS-IIR filter of FIG. 4.

FIG. 5 is a block diagram of a compact implementation of a first-order all-pass section 400. The first-order all-pass section 400 comprises adders 330, subtractor 340, unit delay 410, and multiplier 420. The unit delay 410 is sometimes referred to as a storage element. The multiplier 420 multiplies a signal by a coefficient, $\alpha_{i,j}$.

An advantage of the implementation in FIG. 5 over less compact implementations is that the first-order all-pass section 400 has only one storage element and a single multiplier. Other implementations that trade storage against the number of additions and multiplications can also be used. See S. K. Mitra and K. Hirano, "Digital All-pass Networks," IEEE Trans. Circuits Systs., vol. CAS-21, no. 5, pp. 688–700, September 1974. Finally, this implementation is structurally passive and lends itself well to programming on a fixed-point DSP. See O. Tanrikulu, B. Baykal, A. G. Constantinides, J. A. Chambers and P. A. Naylor, "Finite-precision design and implementation of all-pass polyphase networks for echo cancellation in sub-bands," ICASSP-95, Detroit, USA, vol., 4, pp. 3039–3042, May 1995.

A cascade of two first-order all-pass sections 400 is employed in each signal path of the PS-IIR band-split filter 300. In other words, both the zero'th first-order all-pass section 310 and first first-order all-pass section 320 comprises two first-order all-pass sections 400, as defined by equation (2) and depicted in FIG. 5.

Figure 6:
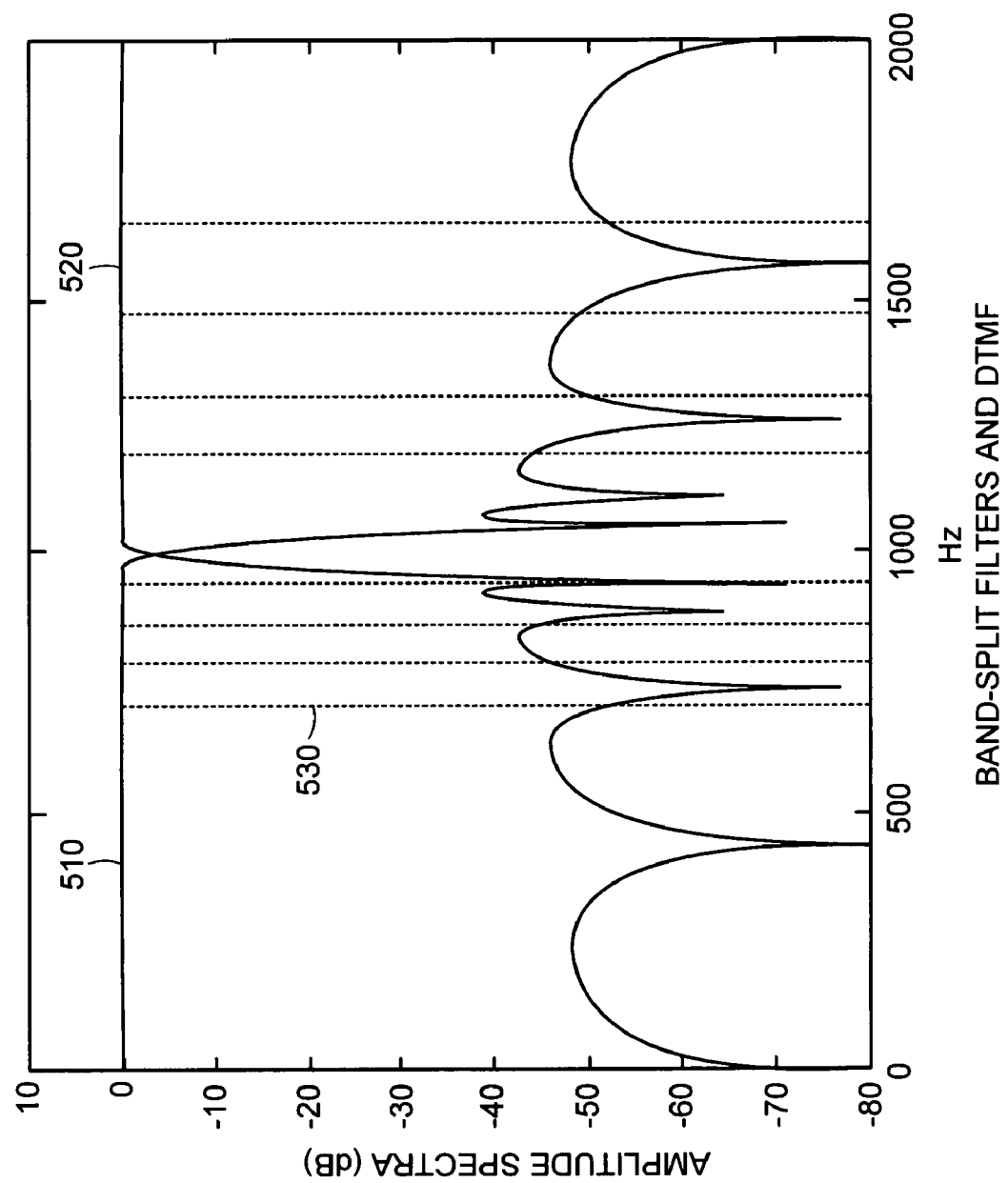
FIG. 6 is a plot of frequency responses of (i) a low-pass filter and a high-pass filter composing the band-split filter of FIG. 4 and (ii) spectral lines corresponding to frequencies of sinusoids in the DTMF protocol.
Figure 7:
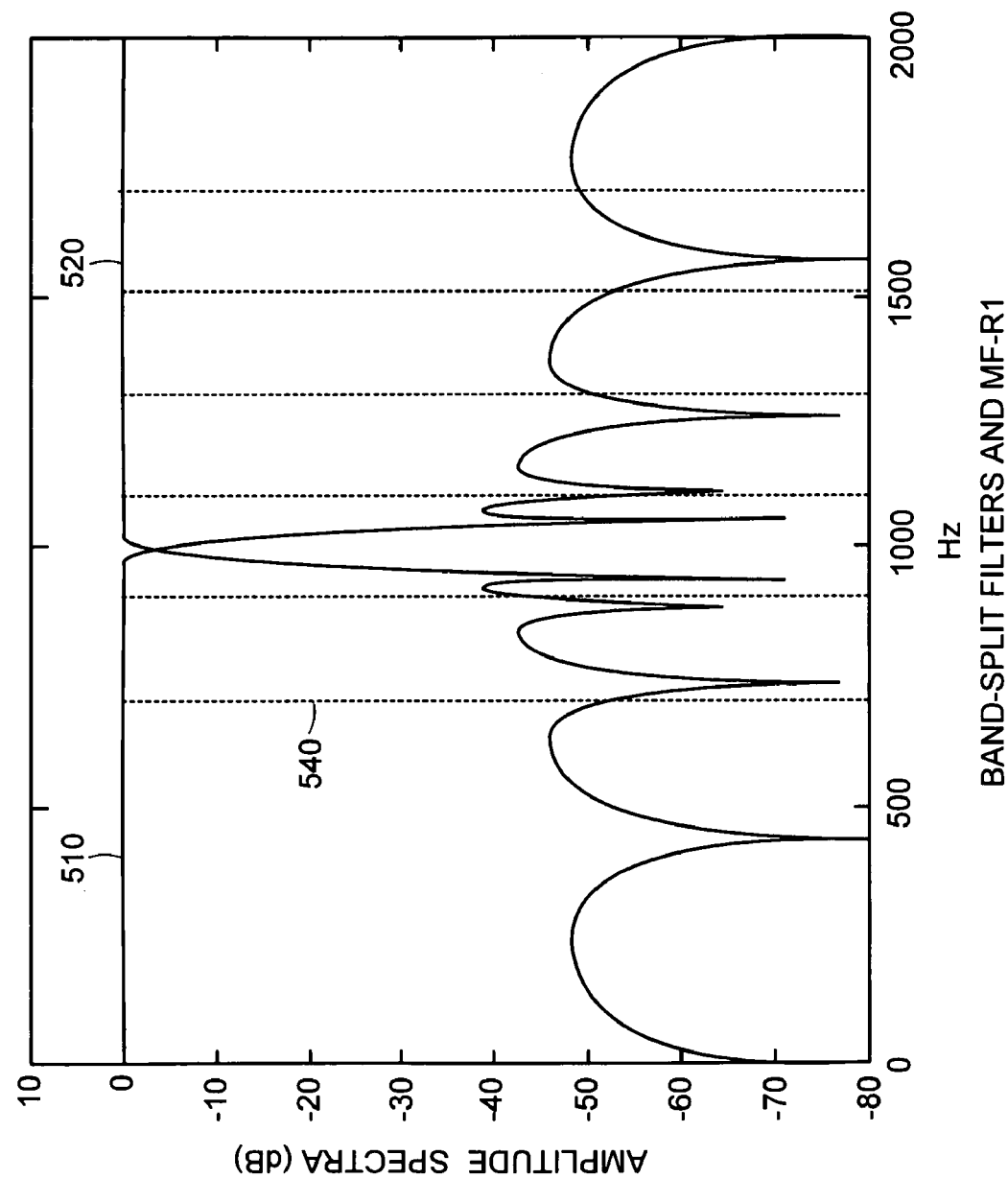
FIG. 7 is a plot of the band-split filter of FIG. 4 and spectral lines of frequencies of sinusoids in the MF-R1 protocol.
Figure 8:
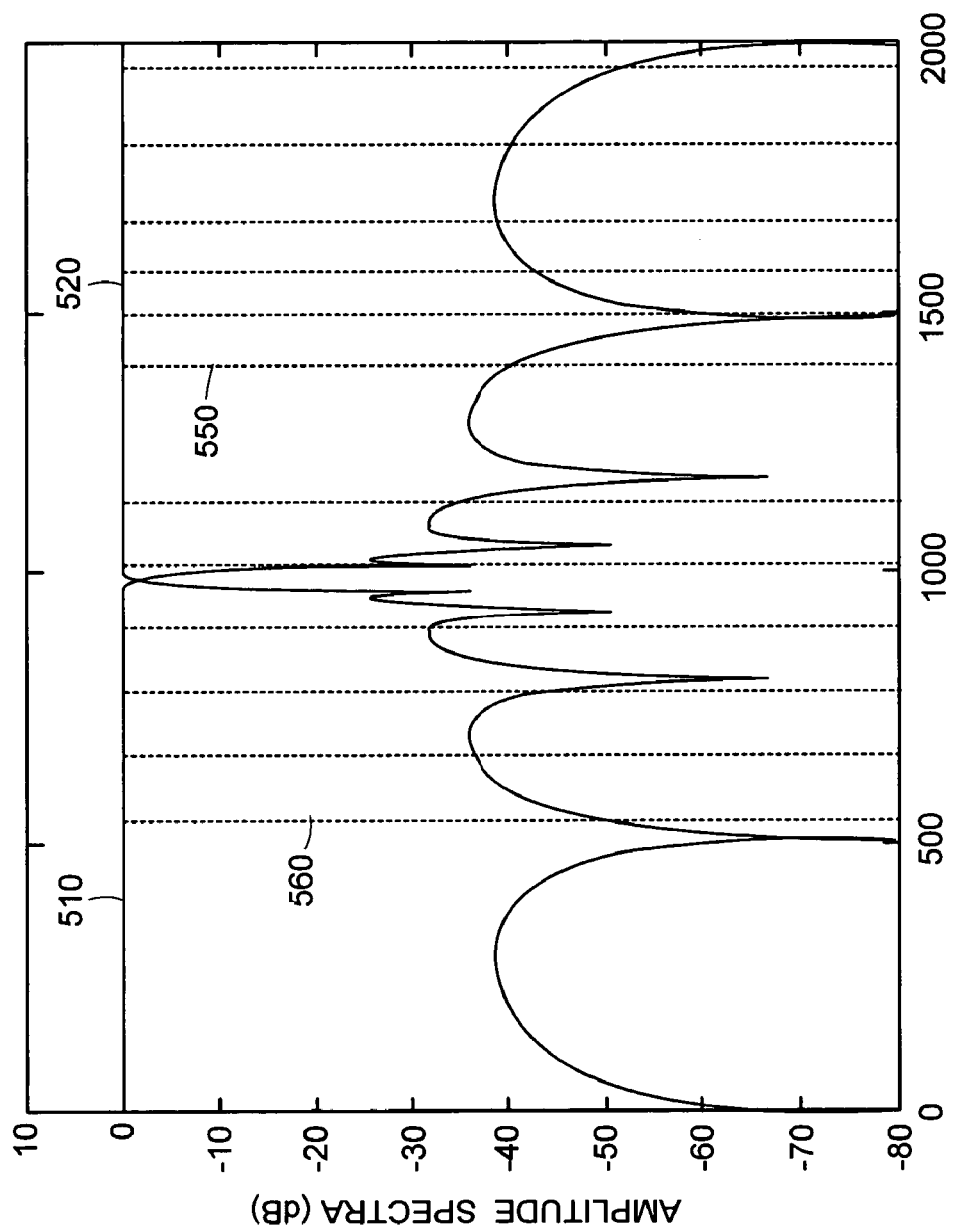
FIG. 8 is a plot of the band-split filter of FIG. 4 and spectral lines of frequencies of sinusoids in the MF-R2 protocol.

Amplitude spectra of $H_L(z)$ and $H_H(z)$ and the frequency spectral lines composing the DTMF, MF-R1 and MF-R2 protocols are shown together in FIGS. 6–8, respectively. Seeing the relationships among filter frequencies and sinusoid frequencies is useful for visualizing how the DTMF detector 240a works in detecting the dialed digits.

FIG. 6 is a plot comprising transfer functions of the band-split filter 300 (FIG. 3) and spectral lines of the frequencies defined in the DTMF protocol. A low-pass filter transfer function 510 is a frequency response of the low pass filter, $H_L(Z)$ of equation (1), from the PS-IIR band-split filter (FIG. 4). A high-pass filter transfer function 520 is a frequency response of the high pass filter, $H_H(z)$ of equation (3), from the PS-IIR band-split filter (FIG. 4). The spectral lines 530 correspond to DTMF row/column frequencies: row frequencies 697 Hz, 770 Hz, 852 Hz, 941 Hz; column frequencies 1209 Hz, 1336 Hz, 1477 Hz, and 1633 Hz.

As suggested by the relationships of the transfer functions 510, 520 and the spectral lines 530 of the DTMF frequencies, the PS-IIR band-split filter 300 sufficiently isolates the row frequencies from the column frequencies. Here, the PS-IIR band split filter is designed to isolate the row and column frequencies at 1 kHz, which is determined by the −3 dB point on the transfer functions 510, 520 corresponding to each of the low- and high-pass filters comprising the PS-IIR filter. However, the row and column frequencies are not symmetrically distributed with respect to the band-split filters. Therefore, since the band-split filters are not perfect (i.e., finite stop-band attenuation) in combination with decimation of the 4 kHz input signal at 2 kHz (i.e., the input switch 305, FIG. 3), leakage of the energy of the row frequencies adds to the energy observed as column frequencies, and vice-versa. This has an impact on the detector design, which is found in the scale factors, $\alpha_r$ and $\alpha_c$, having different values.

In summary, the 2 kHz low-band signal 350 (FIG. 3) comprises the row frequencies, namely 697 Hz, 770 Hz, 852 Hz and 941 Hz that are extracted from the digital signal 215 by the low-pass filter of the PS-IIR filter 300. The 2 kHz high-band signal 360 (FIG. 3) comprises the column frequencies, namely 1209 Hz, 1336 Hz, 1477 Hz, and 1633 Hz, that are extracted from the digital signal 215 by the high-pass filter of the PS-HR band split filter 300. The resulting 2 kHz subband signals are processed separately where advantageous to do so.

Referring again to FIG. 3, the banks of filters 810a, 810b comprise notch filters at row and column frequencies within the respective subbands 350, 360. Outputs from the banks of filters 810a, 810b are received by the DTMF detection logic 850a.

Figure 9:
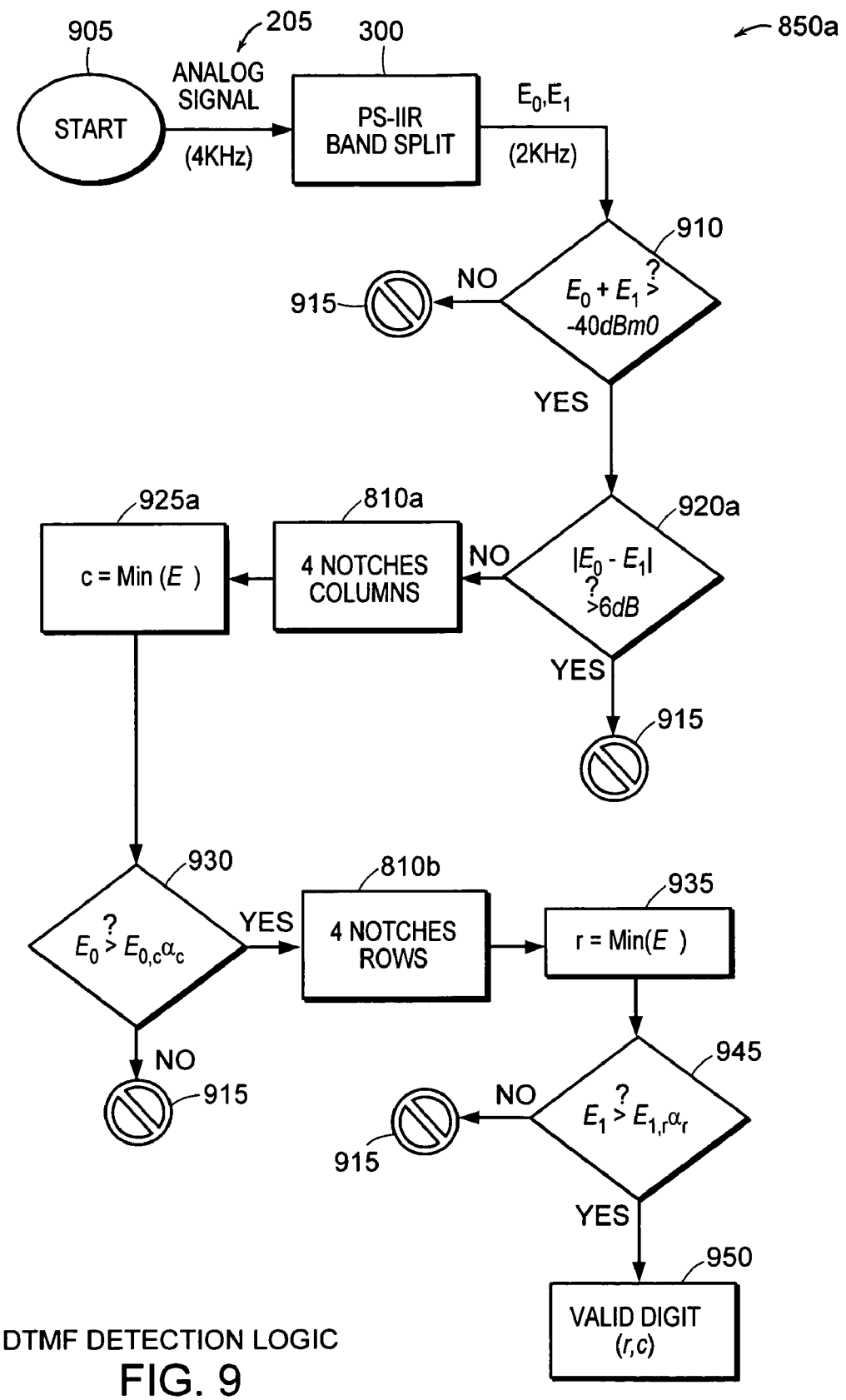
FIG. 9 is a flow diagram of detection logic for the DTMF protocol employed by the DTMF detector of FIG. 3.

FIG. 9 comprises the DTMF detection logic 850a (FIG. 3). The detector starts in step 905 upon receiving the digital signal 215 (FIG. 3). The PS-IIR band split filter 300 separates the digital signal 215 into energy signals $E_0$, $E_1$, as described above. The PS-IIR band split filter 300 has a property that the sum of the energies, $E_0+E_1$, is equal to the energy of the digital signal 215. Thus, a first check is made to determine whether the requisite amount of energy is found in the digital signal 215 received by the DTMF detector 240a (FIG. 3). A signal power level comparator 910 performs the comparison:

$$E_0+E_1>?-40 \text{ dBm0}. \quad (4)$$

If the sum of the energies of $E_0$ and $E_1$ are not greater than −40 dBm0, the notch filters do not operate on the incoming signals, no DTMF is declared, and processing terminates in step 915. Next, a DTMF twist test 920a is performed, where $$|E_o-E_1|>?6 \text{ dB} \quad (5)$$

If the twist test 920a fails, DTMF is not declared, and processing terminates in step 915. Note that this check also prevents speech activity from being falsely detected as DTMF later on, thereby reducing errors due to talk-offs. If the twist test 920a does not fail, then processing continues with the execution of the DTMF low-band notch filters 810a.

The notch filter with the lowest output energy is (i) identified at the output of the DTMF low-band notch filters 810a in step 925a and (ii) compared in step 930 to the corresponding input $E_o$ using the comparison formula $E_o>$? $E_{o,c}\alpha_c$. This comparison yields whether significant energy is residing in the respective notch bandwidth.

If the result of the comparison is negative, DTMF is not declared and processing terminates in step 915. Thus, the processing for the DTMF high-band notch filter 810b is skipped altogether. Either the signal did not satisfy the bandwidth requirements or it was speech and a talk-off signal is presented. If a valid column frequency is detected by the column energy comparator 930, however, the above procedure is repeated for the DTMF high-band notch filters 810b to determine whether $E_i$ comprises a valid row frequency.

A row minimum selector 935 selects the notch filter with the lowest output energy. The energy of the output of the selected notch filter is compared to the corresponding input $E_1$. This comparison yields whether significant energy was residing in that particular notch bandwidth. Similar to the column energy comparator 930, if the row energy comparitor 945 determines that the input energy, $E_1$, is greater than $E_{1,r}$ multiplied by the scale factor $\alpha_r$ (i.e., $E_1>E_{i,r}\alpha_r$), then a valid row frequency is not declared, and the process terminates in step 915. Otherwise, in other words, if valid row and column frequencies are detected, then a valid DTMF is declared for that particular frame of data. As a last protection from false detections, it may be required to detect the DTMF for a number of frames of data to declare a DTMF is received. Note that the process of FIG. 9 is for a single frame of input data.

It should be noted, and it is also true in MF-R1 and MF-R2, that the thresholds used for input/output energy comparisons are not the same for $E_o$ and $E_1$. The reason is that, as observable in FIGS. 6–8, the frequencies of interest and the subband split are not symmetrical with respect to 1000 Hz.

MF-R1 Detection

Figure 10:
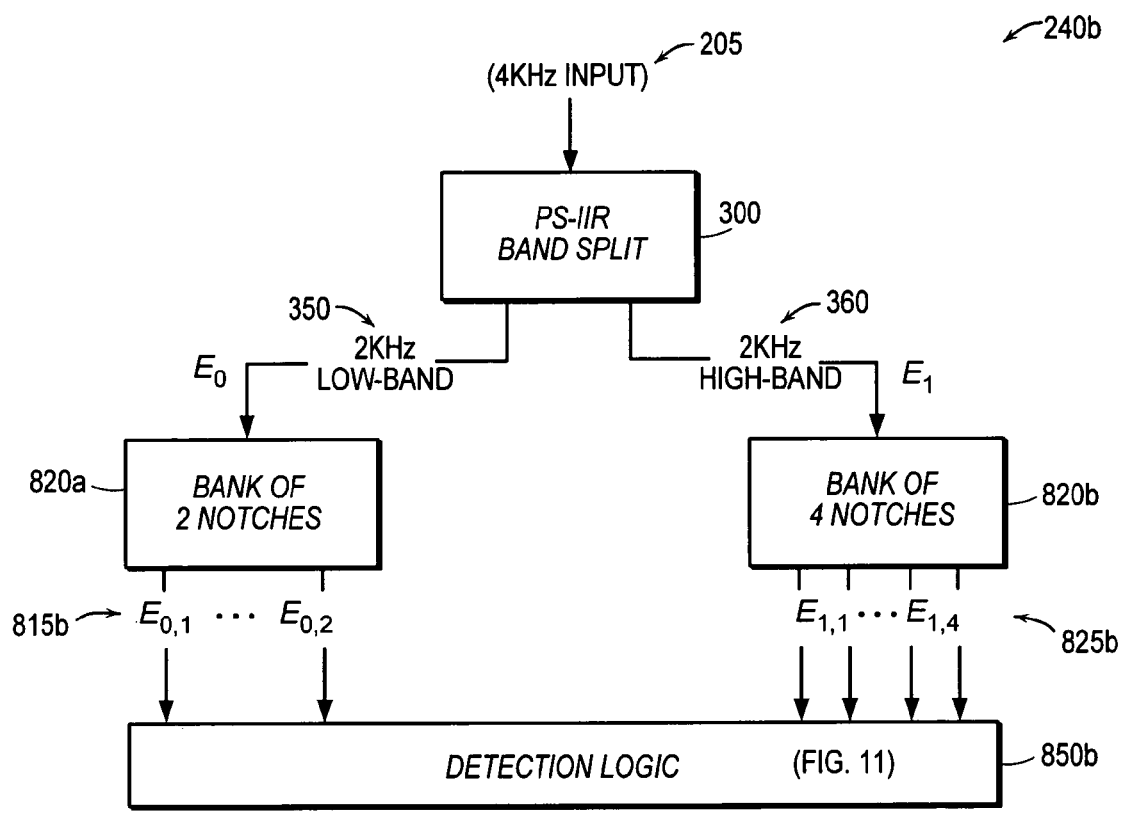
FIG. 10 is a block diagram of an MF-R1 detector employing the PS-IIR band-split filter of FIG. 4.

FIG. 10 is a block diagram for MF-R1 detection. An MF-R1 detector 240b is similar to the DTMF detector 240a (FIG. 3) with two differences. First, the 2 kHz low-band signal 350 contains only two frequencies of interest, which can be observed in the frequency plot of FIG. 7.

Referring to FIG. 7, it is observed that the low-pass filter transfer function 510 and the high-pass filter transfer function 520 describing respective filters composing the PS-IIR band split filter 300 are the same as those for the DTMF detector 240a. However, the MF-R1 frequencies 540 fall within the unity gain regions of the two filters 510, 520 in an unequal manner. Specifically, frequencies 700 Hz and 900 Hz are passed by the low-pass filter of the PS-IIR band-split filter 300, while frequencies 1100 Hz, 1300 Hz, 1500 Hz, and 1700 Hz, are passed by the high-pass filter of the PS-IIR band-split filter 300. Sufficient rejection is provided against frequencies not within the respective passbands of the low and high pass filters.

In the MF-R1 protocol, there is no row/column frequency, as in the DTMF protocol. So, when there is an MF-R1 digit, both frequencies can be located in the same subband. Therefore, the detection logic 850b for the MF-R1 signals (i.e., sinusoids) is different from the detection logic 850a (FIG. 3) for the DTMF signals.

Figure 11A:
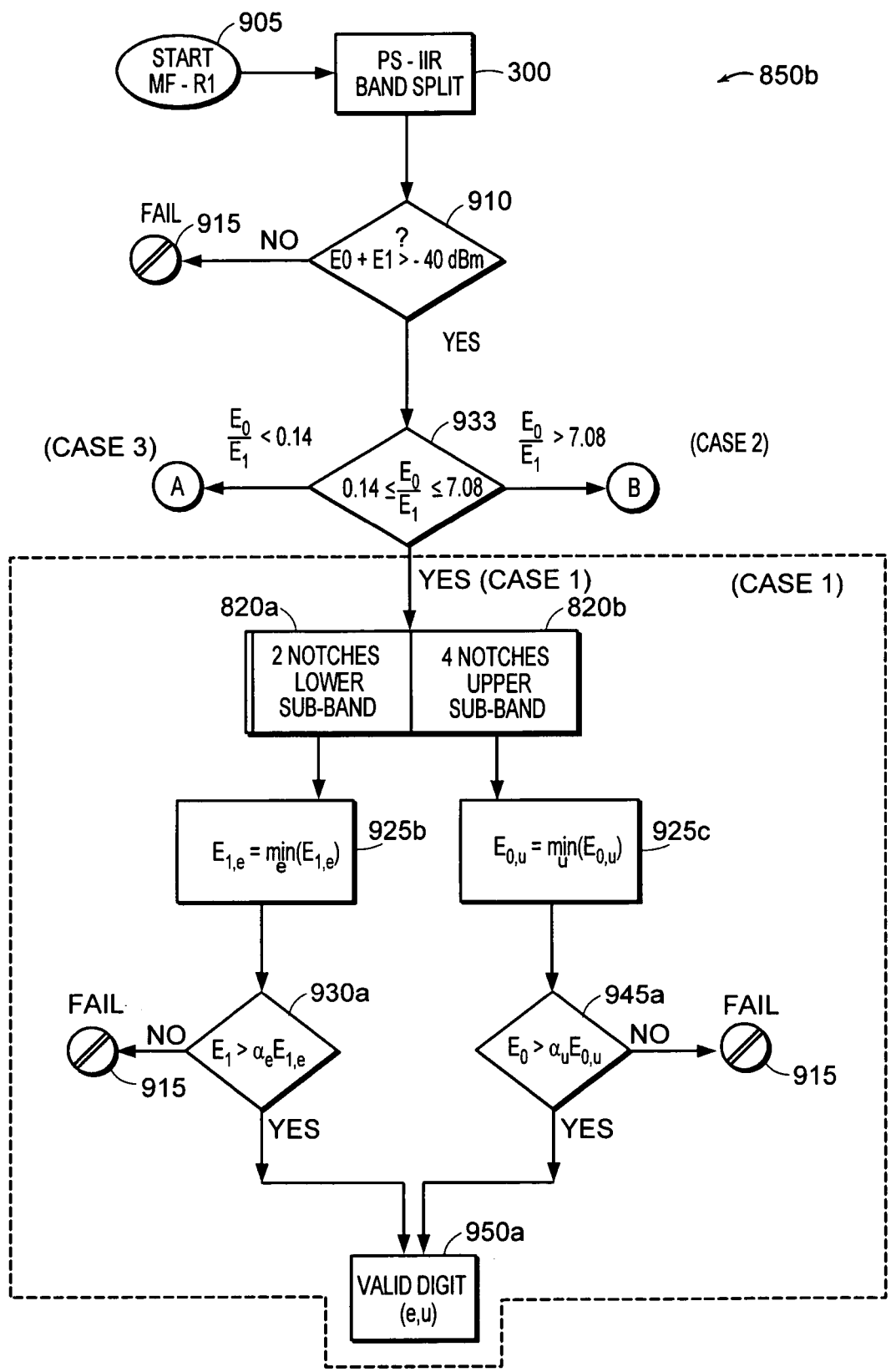
FIG. 11A–11C are flow diagrams of processing composing (i) MF-R1 detection logic and (ii) MF-R2 forward and backward detection logic employed by the detector of FIG. 10.

FIG. 11A is a flow diagram of an MF (MF-R1/R2) detector 850b employed by the MF-R1 detection logic. The MF detector 850b starts in step 905 upon receiving the digital signal 215. The first step of the MF detector 850b, i.e. absolute energy comparison (step 910), is identical to step 910 of the DTMF detector 850a. In the absolute energy comparison, the lower and upper subband energies E0 and E1 are added together and compared with the absolute threshold (−40 dbm0). If the total energy is greater than −40 dBm0, the MF detector 850b proceeds to the next step, the Twist test (step 933). Here, unlike the DTMF case, there are three possible outcomes, referred to as Case 1, Case 2, and Case 3.

$$\text{Case 1:} \quad 0.14 \leq \frac{E_0}{E_1} \leq 7.08$$

Case 1 corresponds to the upper and lower subband energies being within +/−8.5 dB of each other. In this case, there is a high likelihood that tones are present in both the upper and lower subbands. The MF detector 850b then proceeds exactly as in the case of DTMF, picking one tone from each subband. The bandwidth test is then performed using the lowest output energies from the upper and lower subband notches, as determined in steps 925c, 925b, respectively. If $E_0>E_{0,1}\alpha_1$ (step 945a) and $E_1>E_{1,u}\alpha_u$ (step 930a), where $E_{0,1}$ and $E_{1,u}$ are the minimum output energies for the lower and upper subbands respectively, then, in step 950a, the MF detector 850b picks the digit referenced by the two tones.

$$\text{Case 2: } \frac{E_0}{E_1} > 7.08$$

Figure 11B:
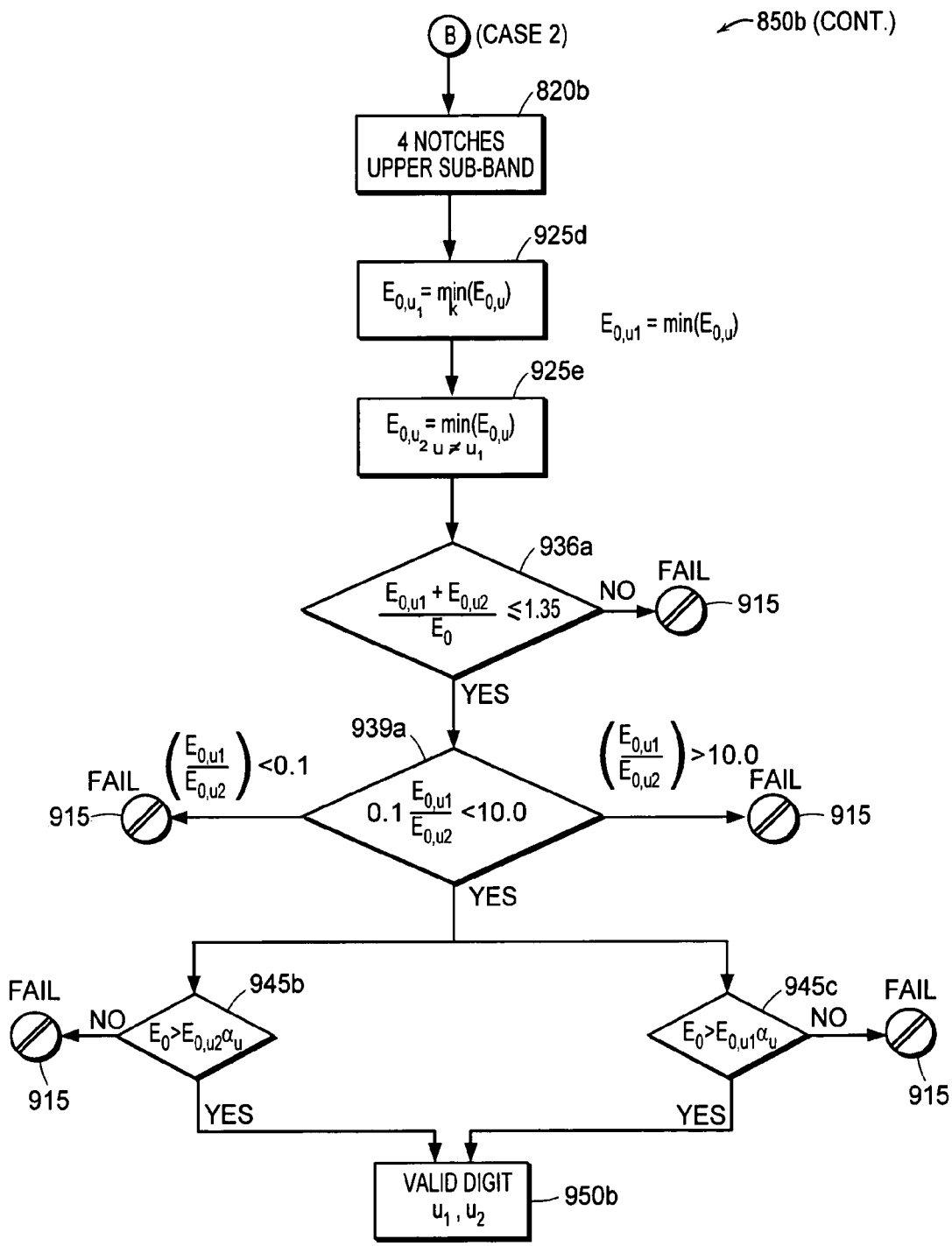

FIG. 11B is a flow diagram of an embodiment of a process of Case 2 of the MF detector. In Case 2, it may be that either (i) there is a twist larger then +8.5 dB in the MF signal (with tones present in both subbands) or (ii) all the energy is present in the upper subband. Case 2 then searches for the lowest two output energies, $E_{o,u1}$ (step 925d) and $E_{o,u2}$ (step 925e) from the four upper subband frequencies.

The first test (step 936a) checks to see how noisy the signal is. If $$\frac{E_{0,u1} + E_{o,u2}}{E_0} < 1.35,$$

the signal is assumed to be relatively noise free. The rationale behind the test of step 936a is that as the noise level in the signal rises (noise in this case being any signal that is not an MF frequency tone), the ratio of $$\frac{E_{0,u1} + E_{o,u2}}{E_0}$$

gets closer and closer to 2.00. For a white noise signal, and using notches of infinitesimal width, the ratio approaches 2.00. On the other hand, with no background noise (i.e. only tonal energy), the ratio approaches 1.00. The test of step 936a is useful for improving the talk-off performance of the MF detector 850b.

The next test (step 939a) checks to see if there are really two distinct tones present in the digital signal 215. If $$0.1 < \frac{E_{0,u1}}{E_{0,u2}} < 10.0,$$

it is likely that there are two tones in the signal, since the output energies from either of the two notches are good estimators of the energy in the other tone in the subband, given that the signal is relatively noise free.

The last test (steps 945b, 945c) performed is the bandwidth test. If $E_0 > E_{o,u1}\alpha_u$ and $E_o > E_{o,u2}\alpha_u$, then in step 950b, the MF detector 850b picks the digits referenced by the two tones.

$$\text{Case 3: } \frac{E_0}{E_1} < 0.14$$

Figure 11C:
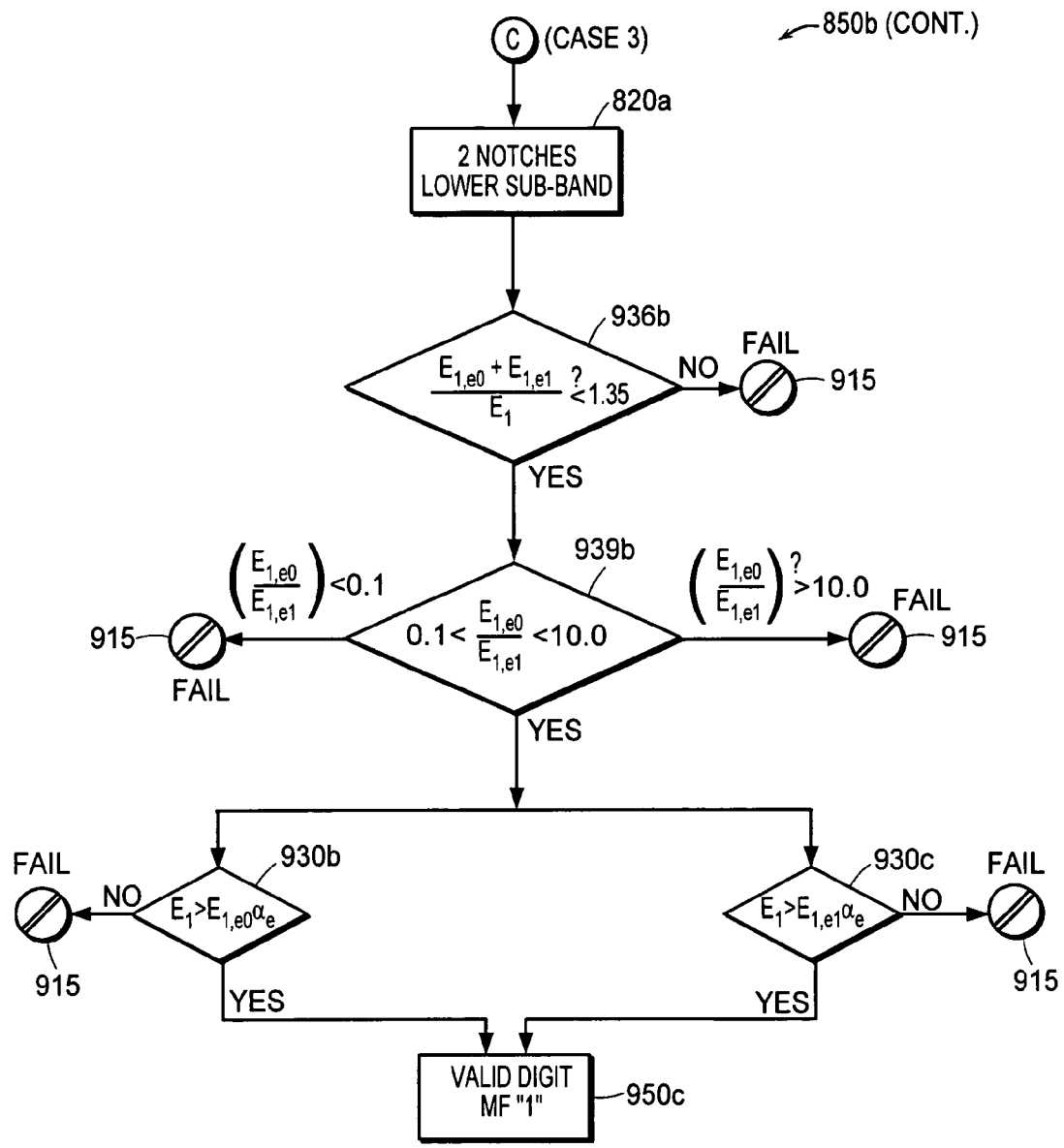

FIG. 11C is a flow diagram of an embodiment of a process of Case 3 of the MF detector 215. Case 3 is the last case in the MF detector logic. Again, it can mean that either all the MF energy is in the lower subband or the twist is greater than −8.5 dB. Since there are only two possible MF frequencies in the lower subband, no search needs to be performed. The output energies $E_{1,10}$ and $E_{1,11}$ are used to carry out a noisy signal test (step 936b), single tone rejection test (step 939b), and bandwidth test (steps 930b, 930c) (as in case 2 above). If all the tests pass, the MF detector 850b picks MF digit "1" in step 950c.

MF-R2 Detection

Figure 12:
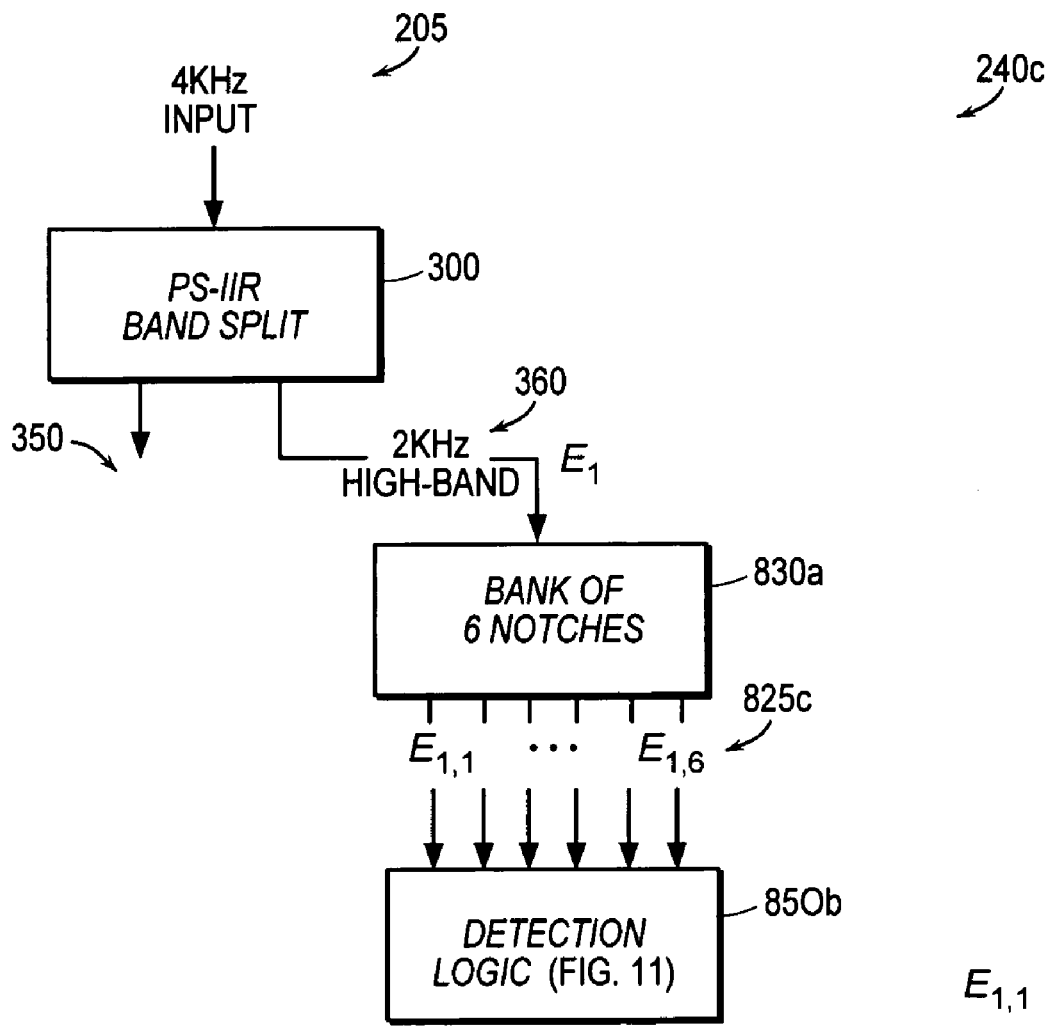
FIG. 12 is a block diagram of a forward detector for the MF-R2 protocol employing the PS-IIR band-split filter of FIG. 4 and employing the detection logic of FIGS. 11A–11C.

Two detectors for forward and backward frequencies are necessary in the MF-R2 protocol case. The MF-R2 forward frequency detector 240c is depicted in FIG. 12. The MF-R2 backward frequency detector 240d is depicted in FIG. 13.

Referring to FIG. 12, the forward frequencies do not include frequencies below 1 kHz. Therefore, there is no 2 kHz low-band signal 350. The 2 kHz high-band signal 360 comprises six signals, which are filtered by a bank of six notch filters 830a. The forward frequencies are indicated in FIG. 8 as the vertical dashed frequency lines 550. The six MF-R2 forward frequencies, namely 1380 Hz, 1500 Hz, 1620 Hz, 1740 Hz, 1860 Hz, and 1980 Hz are passed by the high-pass filter of the PS-IIR band split filter 300 (FIG. 12), as represented by the high-pass filter transfer function 520.

Figure 13:
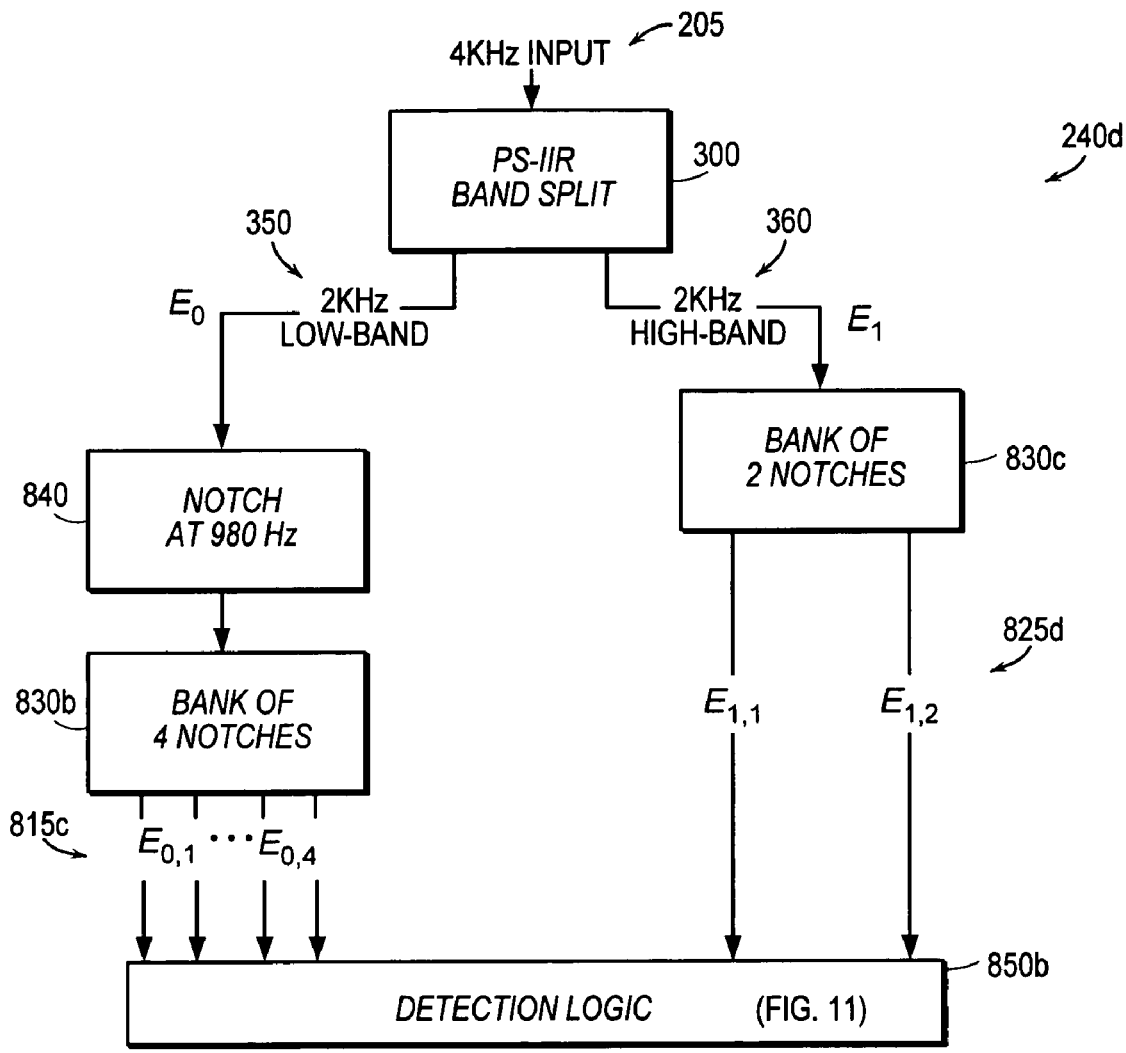
FIG. 13 is a block diagram of a backward detector for the MF-R2 protocol employing the PS-IIR band-split filter of FIG. 4 and employing the detection logic of FIGS. 11A–11C.

FIG. 13 is a block diagram of an MF-R2 backward detector 240d. The MF-R2 protocol comprises sinusoids at backward frequencies below 1 kHz and above 1 kHz, so there are two banks of notch filters 830b, 830c, respectively, to filter corresponding sinusoids. The MF-R2 backward detector 240d comprises an extra notch filter 840 to remove 980 Hz from the lower subband.

Referring again to FIG. 8, the MF-R2 backward frequencies 560 are solid frequency spectra lines in the frequency plot. The backward frequencies are 540 Hz, 660 Hz, 780 Hz, 900 Hz, 1020 Hz, and 1140 Hz. The backward frequency 1020 Hz is within the transition band of both the low-frequency filter and high-frequency filters of the PS-IIR filter 300 (FIG. 13). Therefore, this frequency shows up in both subbands, $E_0$ and $E_1$. To avoid an extra signal from causing an error, the notch filter 840 is used to remove the 1020 Hz frequency from the lower subband.

The DTMF detector 240a passes the Net-4 European tests with no failures. Talk-off tests for the entire Bell-Core test signals yield only 5 talk-off cases compared to an existing DTMF detector, which is one-fifth the density and fails around 250 times. Existing systems provide approximately 300 channels per circuit board, whereas a system employing the filters, etc., described above provides 1500 channels. Through another level of optimization, 2500 channels per board are possible, as described below in reference to FIGS. 14–15.

Since there are eight notch filters but only two signals being detected, there are six notch filters needlessly executing instructions, thus wasting execution cycles. Saving the execution cycles allows for an increase in the number of detectors that may be executed by the DSP 220 (FIG. 2). To determine which two notch filters are necessary for detecting sinusoids present in the digital signal 215 corresponding to the analog signal 205, a preclassifier may be employed. The preclassifier performs frequency estimation to select which two notch filters should be used. Though requiring execution cycles, the preclassifier saves six of eight notch filters from wasting execution cycles, thus increasing the number of detectors per board from 1500 to 2500.

Figure 14:
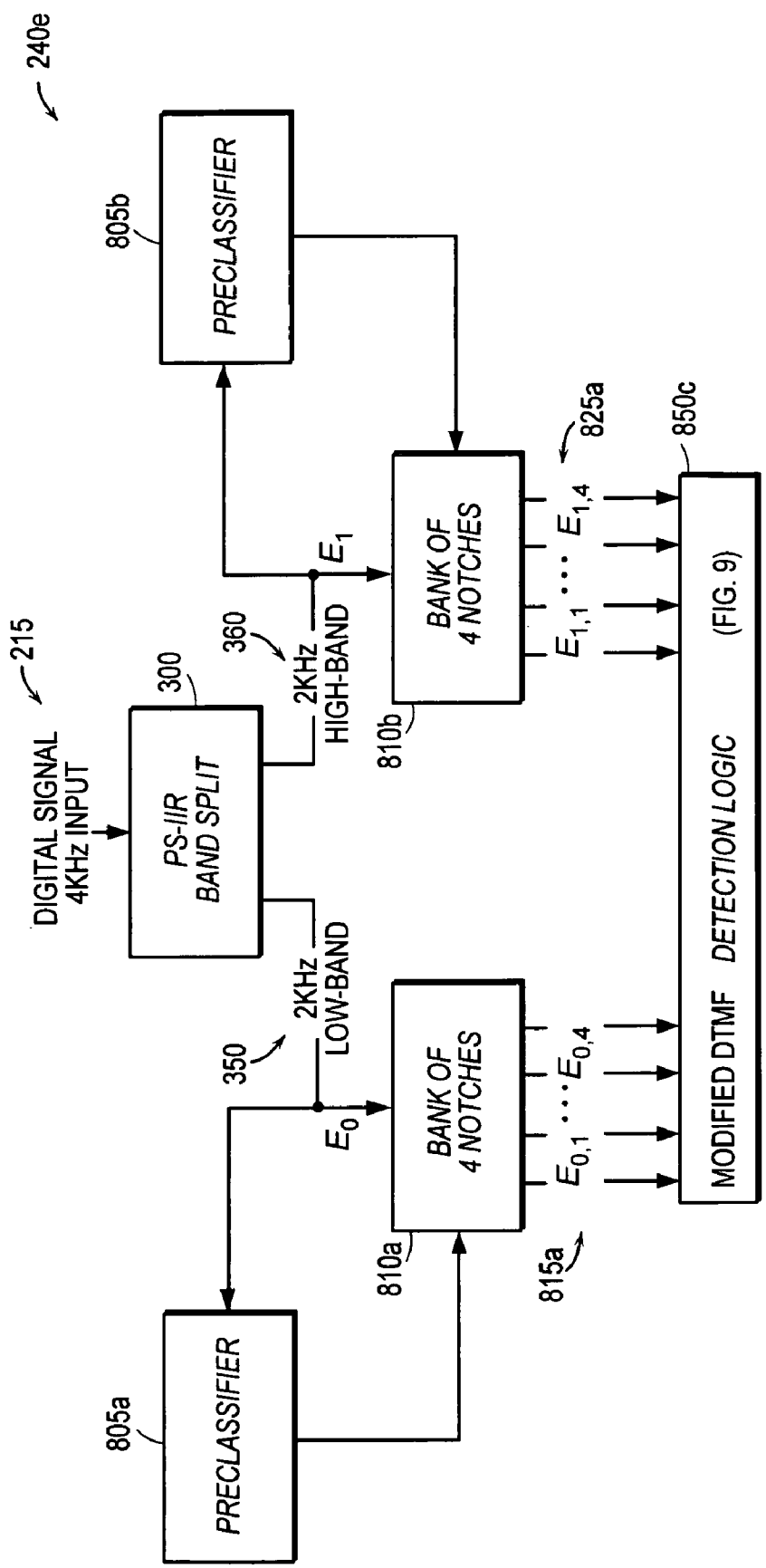
FIG. 14 is a block diagram of the DTMF detector of FIG. 3 further comprising preclassifiers to improve efficiency.

FIG. 14 is a modified DTMF detector 240e. The modified DTMF detector 240e comprises preclassifiers 805a and 805b. The preclassifiers 805a, 805b receive respective subbands 350, 360 from the PS-IIR band split filter 300. Each preclassifier 805a, 805b performs frequency estimation to determine which notch filter(s) within the respective banks of notch filters 810*a*, 810*b* should be executed to determine whether the DTMF signals are present.

Figure 15:
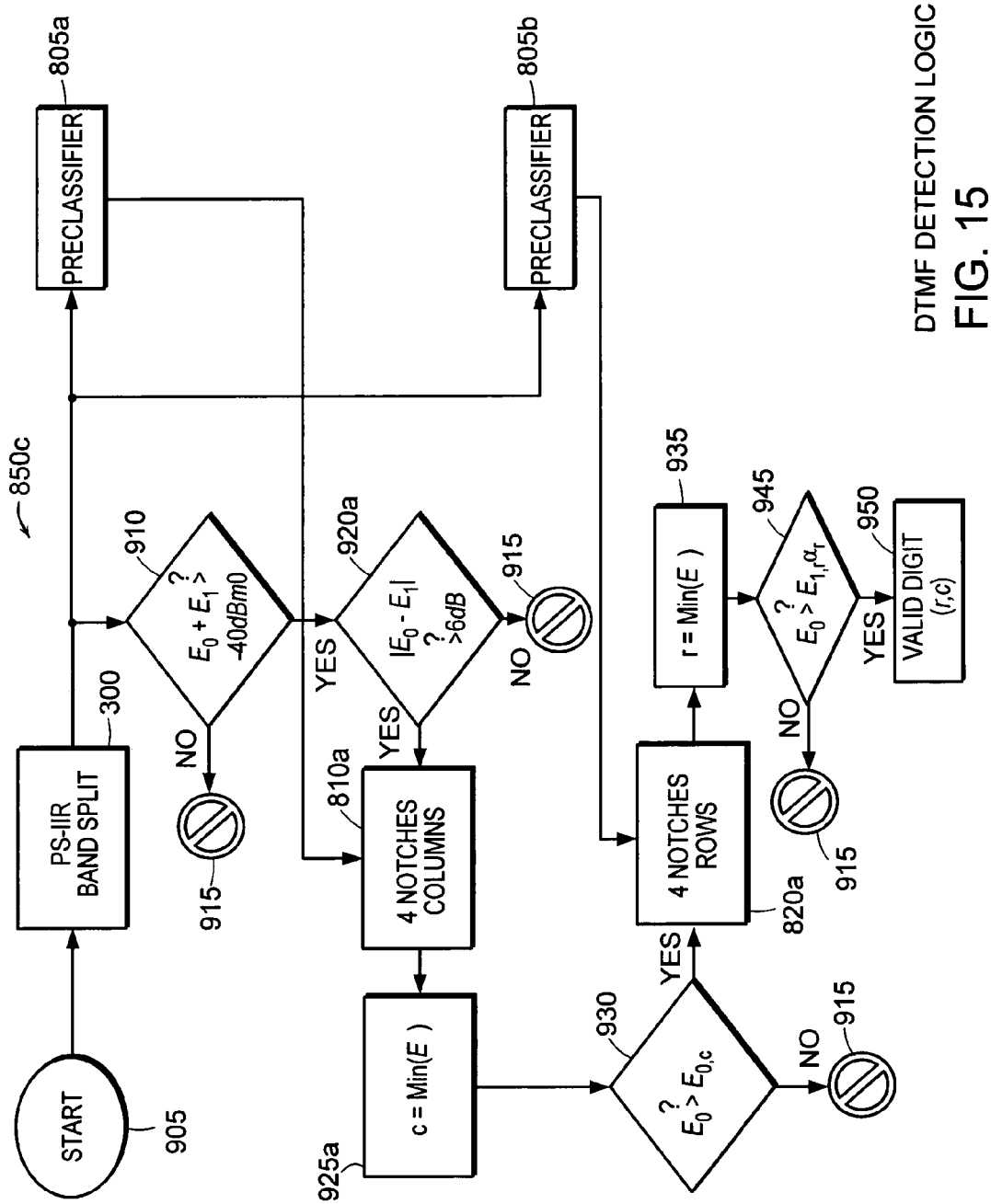
FIG. 15 is a flow diagram of an embodiment of the DTMF detection logic of FIG. 9 further comprising preclassifier steps to improve efficiency.

FIG. 15 is a flow diagram of an embodiment of a modified DTMF detection logic 850*c* employed by the modified DTMF detector 240*e*. The modified DTMF detection logic 850*c* comprises the preclassifiers 805*a*, 805*b* and indicates their relative positions within the process. Other than the preclassifiers 805*a*, 805*b*, the modified DTMF detection logic 850*c* is the same as the DTMF detection logic 850*a* described in FIG. 9.

The signaling detectors described herein take advantage of subband decomposition using IIR filter-banks. This brings high computational efficiency and low memory costs which are useful in high density applications, such as DTMF detection, and increases the number of channels, or customers, a service provider can support from a central office.

Equivalents:

The principles of the present invention allow for the embodiments described herein to be expanded to other forms of encoding protocols, such as protocols comprising three, four, or more sinusoids. Band-reject and band-pass filters rather than strictly low-pass and high-pass filters to produce corresponding three, four, or more subdivisions may be employed; a similar set of filters may be employed in an alternative embodiment of the PS-IIR band-split filter 300 (FIG. 3).

The detection logic, filters, and other aspects of the processes and functions described herein are not restricted to any particular software language or data structure. The hardware depicted is merely exemplary. Alternative processors, from analog circuits to ASICs (application specific integrated circuits), may be employed.

Although subband filtering is employed to dissect the time domain signal by determining a frequency domain signal equivalent, alternative transforms yielding a one-to-one mapping between the time and frequency domains may be employed. Examples of alternative transforms include: DFT (discrete Fourier transform), DHT (discrete Hartley transform), DCT (discrete Cosine trasform), Wavelets, etc. Typical processing following the alternative transforms may vary according to the respective transforms but are still within the scope of the principles of the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining, in an electrical signal, a presence of sinusoids used to encode dialed digits, the method comprising:

splitting the electrical signal into subbands of 0–1 kHz and 1–2 kHz being at a sampling frequency of less than twice the highest frequency used to encode dialed digits; and at the sampling frequency, analyzing energies within the subbands to determine the presence of the sinusoids.

2. The method according to claim 1, wherein splitting the electrical signal into the subbands comprises filtering the electrical signal using a power symmetric infinite impulse response (PS-IIR) filter.

3. The method according to claim 2, wherein the PS-IIR filters are implemented in a polyphase form.

4. The method according to claim 2, wherein the PS-IIR filters comprise all-pass sections implemented in compact realizations.

5. The method according to claim 1, further comprising filtering the subbands with at least one bank of filters comprising filters corresponding to the number of possible frequencies of the sinusoids within the respective subbands.

6. The method according to claim 5, wherein the filters are notch filters.

7. The method according to claim 5, wherein, for DTMF detection, splitting the electrical signal comprises (i) extracting a 0–1 kHz subband and a 1–2 kHz subband and (ii) filtering the subbands with four notch filters per bank of filters.

8. The method according to claim 5, wherein, for MF-R1 detection, splitting the electrical signal comprises (i) extracting a 0–1 kHz subband and a 1–2 kHz subband and (ii) filtering the 0–1 kHz subband with two notch filters and the 1–2 kHz subband with four notch filters.

9. The method according to claim 5, wherein:

for MF-R2 forward detection, splitting the electrical signal comprises (i) extracting a 0–1 kHz subband and 1–2 kHz subband and (ii) filtering the 1–2 kHz subband with six notch filters; and for backward detection, splitting the electrical signal comprises (i) extracting a 0–1 kHz subband and a 1–2 kHz subband and (ii) filtering the 0–1 kHz subband with a notch filter at 980 Hz, to remove aliasing of a 1020 Hz tone in the 1–2 kHz subband, and four other notch filters and the 1–2 kHz subband with two notch filters.

10. The method according to claim 5, further comprising preclassifying the sinusoids in the subbands and selecting filters within respective banks of filters that match frequencies of the preclassified sinusoids.

11. The method according to claim 1, wherein analyzing the energies comprises determining whether a summing of the energies in the subbands exceeds a minimum threshold level.

12. The method according to claim 1, wherein analyzing the energies comprises determining whether a difference between the energies in the subbands is below a twist-test threshold.

13. The method according to claim 1, wherein for each subband, analyzing the energies comprises comparing energy levels of an output of a notch filter having a lowest output energy level from among at least two notch filters in a bank of filters to the energy of the input signal to the bank of filters.

14. The method according to claim 1, wherein analyzing the energies further comprises reporting valid dialed digits.

15. The method according to claim 1, wherein the electrical signal is sampled by an analog-to-digital converter and splitting and analyzing the electrical signal is executed by a digital processor.

16. The method according to claim 1 wherein splitting the electrical signal is performed at about the highest frequency of the sinusoids.

17. The method according to claim 1 wherein analyzing the energies is performed at about the highest frequency of the sinusoids.

18. The method according to claim 1 wherein the sampling frequency is about 2 kHz.

19. An apparatus, comprising:

a splitter to separate an electrical signal, including sinusoids corresponding to frequencies of dialed digits, into subbands of 0–1 kHz and 1–2 kHz being at a sampling frequency of less than twice the highest frequency used to encode dialed digits; and an analyzer, operating at the sampling frequency, to measure energies within the subbands to determine a presence of the sinusoids.

20. The apparatus according to claim 19, wherein the splitter comprises a power symmetric infinite impulse response (PS-IIR) filter to separate the signal into subbands.

21. The apparatus according to claim 19, further comprising at least one bank of filters to filter the subbands, the bank of filters comprising filters corresponding to the number of possible frequencies of sinusoids within the respective subbands.

22. The apparatus according to claim 21, wherein the filters are notch filters.

23. The apparatus according to claim 21, further comprising at least one preclassifier to determine the sinusoids in the subbands and to select filters within respective banks of filters that match frequencies of the sinusoids.

24. The apparatus according to claim 19, wherein the electrical signal is sampled by an analog-to-digital converter and the splitter and analyzer are implemented in digital processor instructions and executed by a digital processor.

25. The apparatus according to claim 19 being employed in a device supporting voice-over-IP.

26. The apparatus according to claim 19 wherein the splitter operates at about the highest frequency of the sinusoids.

27. The apparatus according to claim 19 wherein the analyzer operates at about the highest frequency of the sinusoids.

28. The apparatus according to claim 19 wherein the sampling frequency is about 2 kHz.

29. An apparatus, comprising:
an analog-to-digital converter sampling a received analog signal, including sinusoids corresponding to frequencies of dialed digits, and outputting a corresponding digital signal; and
a digital processor coupled to an output of the analog-to-digital converter to receive the digital signal, the digital signal processor executing program instructions to:
split the digital signal into subbands of 0–1 kHz and 1–2 kHz being at a sampling frequency of less than twice the highest frequency used to encode dialed digits; and
at the sampling frequency, analyze energies within the subbands to determine a presence of the sinusoids.

30. The apparatus according to claim 29, wherein the program instructions to split the electrical signal into the subbands comprise instructions to filter the electrical signal using a power symmetric infinite impulse response (PS-IIR) filter.

31. The apparatus according to claim 29, further comprising program instructions to filter the subbands with at least one bank of filters comprising filters corresponding to the number of possible frequencies of sinusoids within the respective subbands.

32. The apparatus according to claim 31, wherein the filters are notch filters.

33. The apparatus according to claim 31, further comprising program instructions to preclassify the sinusoids in the subbands and select filters within respective banks of filters that match frequencies of the preclassified sinusoids.

34. The apparatus according to claim 29 employed in a device supporting voice-over-IP.

35. The apparatus according to claim 29 wherein the program instructions to split the digital signal into subbands split the digital signal at about the highest frequency of the sinusoids.

36. The apparatus according to claim 29 wherein the program instructions to analyze the energies of the digital signal analyze the energies at about the highest frequency of the sinusoids.

37. The apparatus according to claim 29 wherein the sampling frequency is about 2 kHz.

38. An apparatus, comprising:
means for splitting an electrical signal, including sinusoids corresponding to frequencies of dialed digits, into subbands of 0–1 kHz and 1–2 kHz being at a sampling frequency of less than twice the highest frequency used to encode dialed digits; and
means for analyzing, at the sampling frequency, energies within the subbands to determine a presence of the sinusoids.

39. The apparatus according to claim 38 employed in a device supporting voice-over-IP.

40. A computer-readable medium having stored thereon sequences of instructions, the sequences of instructions including instructions, when executed by a processor, causes the processor to perform:
splitting an electrical signal, including sinusoids corresponding to frequencies of dialed digits, into subbands of 0–1 kHz and 1–2 kHz being at a sampling frequency of less than twice the highest frequency used to encode dialed digits; and
at the sampling frequency, analyzing energies within the subbands to determine a presence of the sinusoids.

41. The computer-readable medium of claim 40, wherein splitting the electrical signal into subbands comprises filtering the electrical signal using a power symmetric infinite impulse response (PS-IIR) filter.

42. The computer-readable medium of claim 40, further comprising instructions which, when executed by the processor, causes the processor to filter the subbands with at least one bank of filters comprising filters corresponding to the number of possible frequencies of sinusoids within the respective subbands.

43. The computer-readable medium of claim 42, wherein the filters are notch filters.

44. The computer-readable medium of claim 42, further comprising instructions which, when executed by the processor, causes the processor (i) to preclassify the sinusoids in the subbands and (ii) to select filters within respective banks of filters that match frequencies of the preclassified sinusoids.

45. The computer-readable medium of claim 40 wherein splitting the electrical signal is performed at about the highest frequency of the sinusoids.

46. The computer-readable medium of claim 40 wherein analyzing the energies is performed at about the highest frequency of the sinusoids.

47. The computer-readable medium of claim 40 wherein the sampling frequency is about 2 kHz.

48. A voice-over-IP device, comprising:
a receiver receiving electrical signals composed of voice signals and dialed digit sinusoids corresponding to dialed digits;
a detector coupled to the receiver to monitor the electrical signals and to detect the dialed digit sinusoids, said detector including:

a splitter to split the electrical signal into subbands of 0–1 kHz and 1–2 kHz being at a sampling frequency of less than twice the highest frequency used to encode dialed digits;

an analyzer, operating at the sampling frequency, to analyze energies within subbands to determine a presence of the sinusoids; and a generator to generate packets of data comprising (i) voice signal data and (ii) information corresponding to the dialed digits.

49. The computer-readable medium of claim 48 wherein the sampling frequency is about 2 kHz.

50. A method for determining, in an electrical signal, a presence of sinusoids used to encode dialed digits, the method comprising:

rate change splitting the electrical signal into subbands of 0–1 kHz and 1–2 kHz being at a sampling frequency of less than twice the highest frequency used to encode dialed digits; and analyzing energies within the subbands to determine the presence of the sinusoids corresponding to frequencies of the dialed digits.

51. The method according to claim 50, wherein rate change splitting the electrical signal into the subbands comprises filtering the electrical signal using a power symmetric infinite impulse response (PS-IIR) filter.

52. The method according to claim 50, wherein the PS-IIR filter is implemented in a polyphase form.

53. The method according to claim 51, wherein the PS-IIR filters comprise all-pass sections implemented in compact realizations.

54. An apparatus, comprising:

a splitter that separates and decimates an electrical signal into subbands of 0–1 kHz and 1–2 kHz being at a sampling frequency of less than twice the highest frequency used to encode dialed digits; and an analyzer that measures energies within the subbands to determine a presence of sinusoids corresponding to frequencies of dialed digits.

55. The apparatus according to claim 54, wherein the splitter comprises a power symmetric infinite impulse response (PS-IIR) filter to separate the signal into subbands.

56. The method according to claim 55, wherein the PS-IIR filter is implemented in a polyphase form.

57. The method according to claim 55, wherein the PS-IIR filters comprise all-pass sections implemented in compact realizations.

58. An apparatus for determining, in an electrical signal, a presence of sinusoids used to encode dialed digits, the method comprising:

means for rate change splitting the electrical signal into subbands of 0–1 kHz and 1–2 kHz being at a sampling frequency of less than twice the highest frequency used to encode dialed digits; and means for analyzing energies within the subbands to determine the presence of the sinusoids corresponding to frequencies of the dialed digits.

59. A method for determining, in an electrical signal, a presence of sinusoids used to encode dialed digits, the method comprising:

splitting the electrical signal into subbands being at a sampling frequency of less than twice the highest frequency used to encode dialed digits, splitting the electrical signal into the subbands comprising filtering the electrical signal using a power symmetric infinite impulse response (PS-IIR) filter; and at the sampling frequency, analyzing energies within the subbands to determine the presence of the sinusoids.

60. The method according to claim 59, wherein splitting the electrical signal into the subbands comprises extracting subbands of 0–1 kHz and 1–2 kHz.

61. The method according to claim 59, wherein the PS-IIR filter is implemented in a polyphase form.

62. The method according to claim 59, wherein the PS-IIR filter comprises all-pass sections implemented in compact realizations.

63. An apparatus, comprising:

a splitter to separate an electrical signal, including sinusoids corresponding to frequencies of dialed digits, into subbands being at a sampling frequency of less than twice the highest frequency used to encode dialed digits, the splitter comprising a power symmetric infinite impulse response (PS-IIR) filter to separate the signal into subbands; and an analyzer, operating at the sampling frequency, to measure energies within the subbands to determine a presence of the sinusoids.

64. The apparatus according to claim 63, wherein the splitter extracts subbands of 0–1 kHz and 1–2 kHz.

65. The apparatus according to claim 63, wherein the PS-IIR filter is implemented in a polyphase form.

66. The apparatus according to claim 63, wherein the PS-IIR filter comprises all-pass sections implemented in compact realizations.

67. An apparatus, comprising:

an analog-to-digital converter sampling a received analog signal, including sinusoids corresponding to frequencies of dialed digits, and outputting a corresponding digital signal; and a digital processor coupled to an output of the analog-to-digital converter to receive the digital signal, the digital signal processor executing program instructions to:

split the digital signal into subbands being at a sampling frequency of less than twice the highest frequency used to encode dialed digits, the program instructions to split the electrical signal into the subbands comprising instructions to filter the electrical signal using a power symmetric infinite impulse response (PS-IIR) filter; and at the sampling frequency, analyze energies within the subbands to determine a presence of the sinusoids.

68. The apparatus according to claim 67, wherein the program instructions to split the digital signal into subbands comprise instructions to extract subbands of 0–1 kHz and 1–2 kHz.

69. The apparatus according to claim 67, wherein the PS-IIR filter is implemented in a polyphase form.

70. The apparatus according to claim 67, wherein the PS-IIR filter comprises all-pass sections implemented in compact realizations.

71. A computer-readable medium having stored thereon sequences of instructions, the sequences of instructions including instructions, when executed by a processor, causes the processor to perform:

splitting an electrical signal, including sinusoids corresponding to frequencies of dialed digits, into subbands being at a sampling frequency of less than twice the highest frequency used to encode dialed digits, splitting the electrical signal into subbands comprising filtering the electrical signal using a power symmetric infinite impulse response (PS-IIR) filter; and at the sampling frequency, analyzing energies within the subbands to determine a presence of the sinusoids.

72. The computer-readable medium of claim 71, wherein splitting the electrical signal into subbands comprises extracting subbands of 0–1 kHz and 1–2 kHz.

73. The computer-readable medium of claim 71, wherein the PS-IIR filter is implemented in a polyphase form.

74. The computer-readable medium of claim 71, wherein the PS-IIR filter comprises all-pass sections implemented in compact realizations.

75. A method for determining, in an electrical signal, a presence of sinusoids used to encode dialed digits, the method comprising:
  rate change splitting the electrical signal into subbands, rate change splitting the electrical signal into the subbands comprising filtering the electrical signal using a power symmetric infinite impulse response (PS-IIR) filter; and
  analyzing energies within the subbands to determine the presence of the sinusoids corresponding to frequencies of the dialed digits.

76. The method according to claim 75, wherein splitting and decimating the electrical signal into the subbands comprises extracting subbands of 0–1 kHz and 1–2 kHz.

77. The method according to claim 75, wherein the PS-IIR filter is implemented in a polyphase form.

78. The method according to claim 75, wherein the PS-IIR filters comprise all-pass sections implemented in compact realizations.

79. An apparatus, comprising:
  a splitter that separates and decimates an electrical signal into subbands, the splitter comprising a power symmetric infinite impulse response (PS-IIR) filter to separate the signal into subbands; and
  an analyzer that measures energies within the subbands to determine a presence of sinusoids corresponding to frequencies of dialed digits.

80. The apparatus according to claim 79, wherein the splitter extracts subbands of 0–1 kHz and 1–2 kHz.

81. The apparatus according to claim 79, wherein the PS-IIR filter is implemented in a polyphase form.

82. The apparatus according to claim 79, wherein the PS-IIR filter comprises all-pass sections implemented in compact realizations.

* * * * *